United States Patent [19]

Vansteelant

[11] 4,372,588
[45] Feb. 8, 1983

[54] KNOTTER BILLHOOK

[75] Inventor: Marc G. Vansteelant, Zedelgem, Belgium

[73] Assignee: Sperry Corporation, New Holland, Pa.

[21] Appl. No.: 274,033

[22] Filed: Jun. 15, 1981

[30] Foreign Application Priority Data

Jul. 5, 1980 [GB] United Kingdom ............. 8022112

[51] Int. Cl.³ .......................................... B65H 69/04
[52] U.S. Cl. .................................... 289/8; 289/11; 289/14
[58] Field of Search ...................... 289/2, 5–14

[56] References Cited

U.S. PATENT DOCUMENTS

| 250,956 | 12/1881 | Ogden | 289/8 |
|---|---|---|---|
| 483,914 | 10/1892 | Gaskill | 289/12 |
| 1,272,277 | 7/1918 | Raney | 289/13 |
| 2,981,174 | 4/1961 | Freeman | 100/21 |
| 3,101,963 | 8/1963 | Sullivan et al. | 289/11 |
| 3,138,395 | 6/1964 | Harper | 289/9 |
| 3,168,342 | 2/1965 | Harper | 289/2 |
| 3,254,911 | 6/1966 | Crawford | 289/13 |
| 3,410,589 | 11/1968 | Nolt | 289/8 |
| 3,430,998 | 3/1969 | Ralston | 289/14 |
| 4,161,097 | 7/1979 | Vansteelant | 289/2 X |

FOREIGN PATENT DOCUMENTS

| 357710 | 8/1922 | Fed. Rep. of Germany . | |
| 1241984 | 8/1971 | United Kingdom | 289/13 |
| 2051889 | 1/1981 | United Kingdom . | |

Primary Examiner—Louis Rimrodt
Attorney, Agent, or Firm—Darrell F. Marquette; Larry W. Miller; Frank A. Seemar

[57] ABSTRACT

A knotter apparatus is improved by providing a frame supporting first and second rotatable shafts. A plurality of flanges are mounted on the first shaft and a billhook is angularly mounted on the second shaft. A plurality of twine holder fingers are pivotally supported by the frame and resiliently urged relative to the flanges. The second shaft is operable for intermittently driving the first shaft.

42 Claims, 28 Drawing Figures

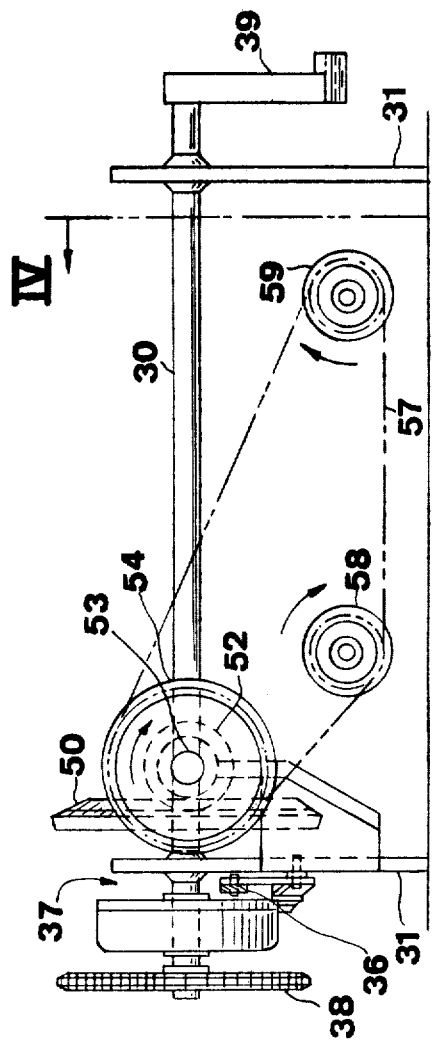
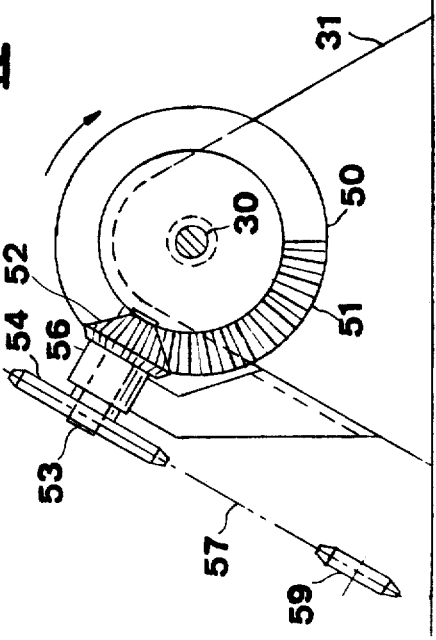

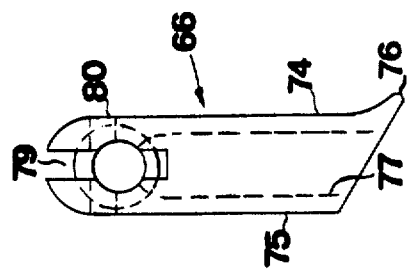
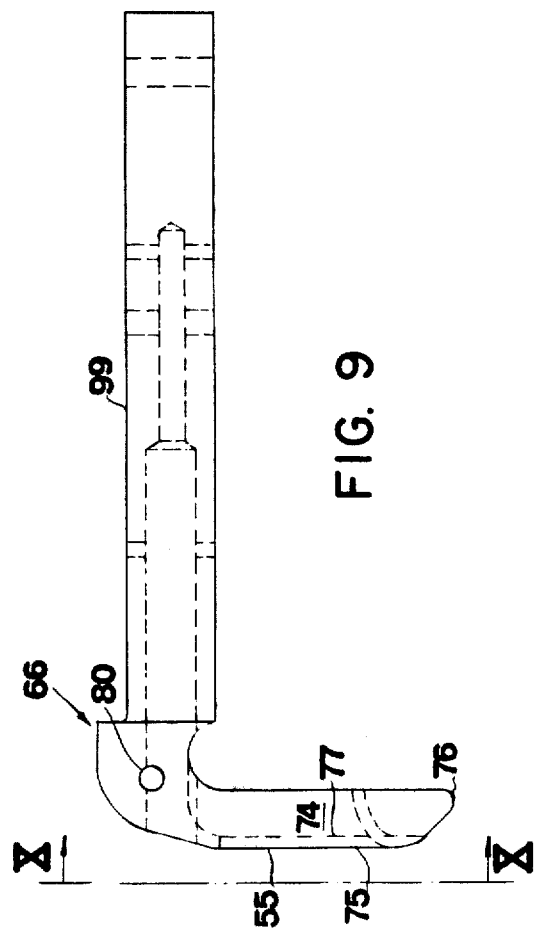
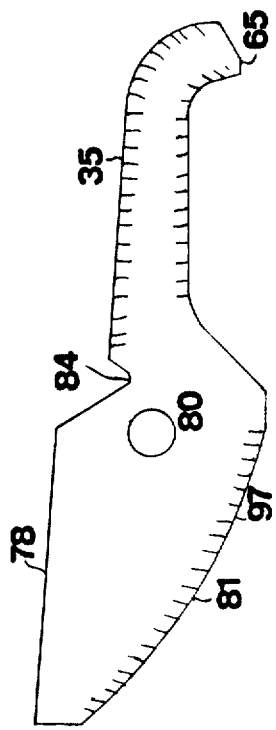

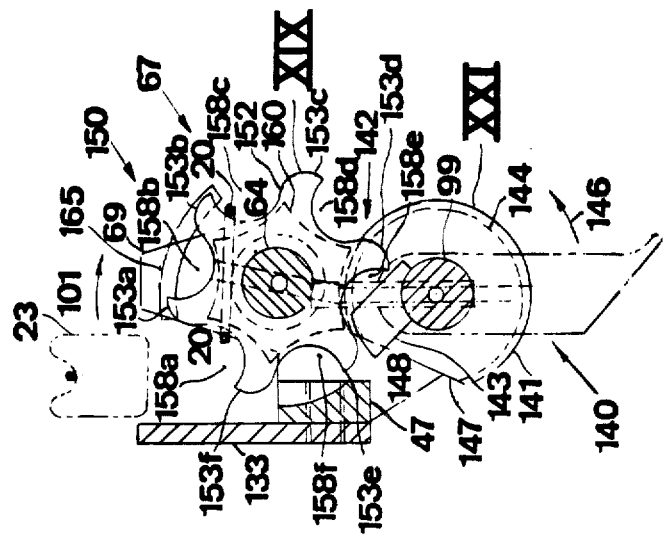
FIG. 18
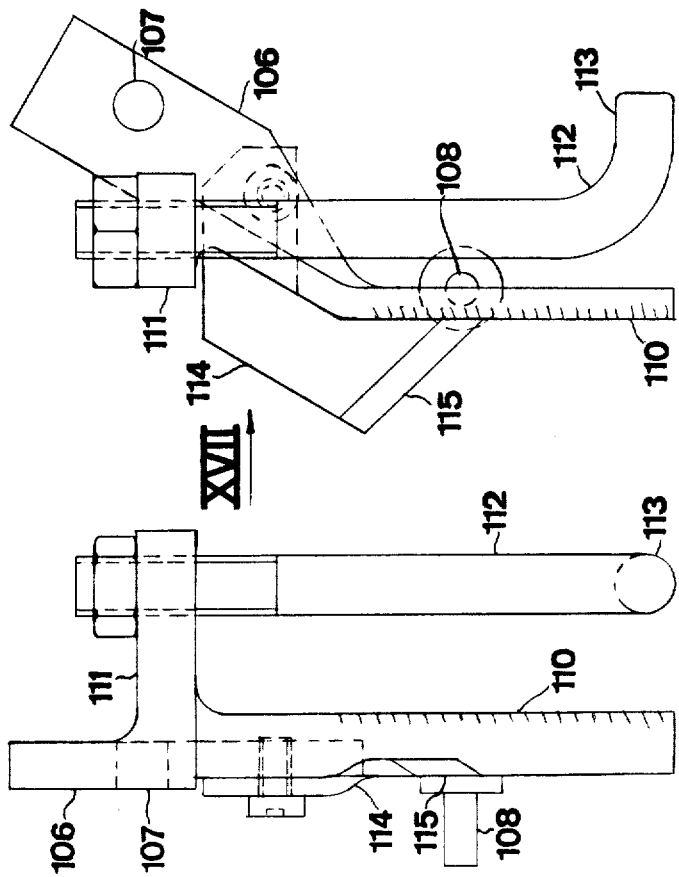
FIG. 16
FIG. 17

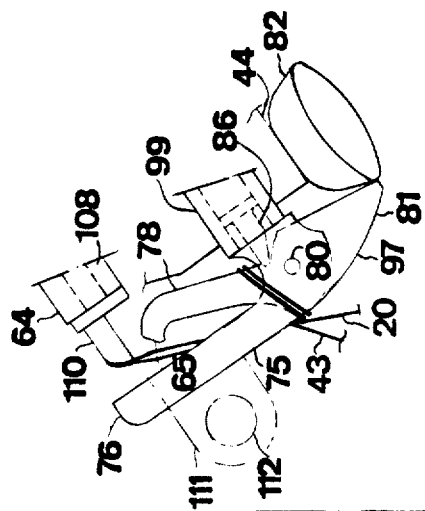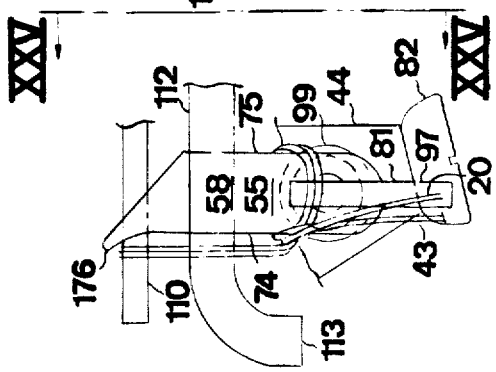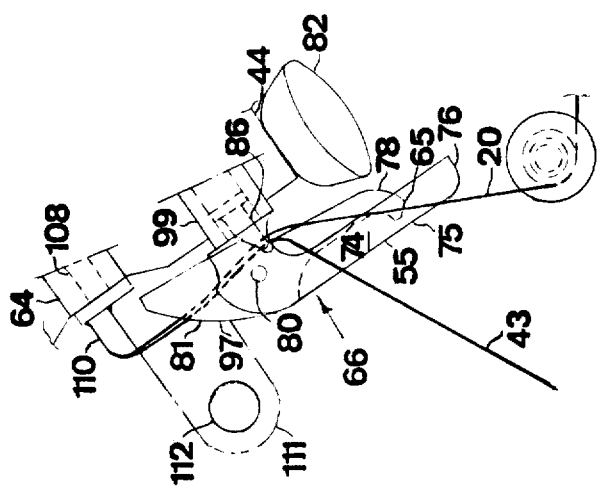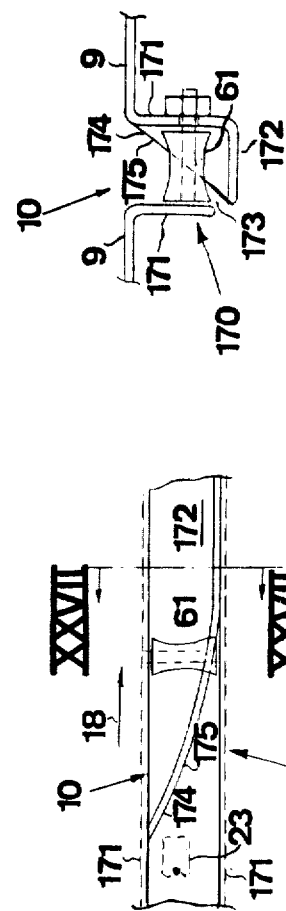

KNOTTER BILLHOOK

BACKGROUND OF THE INVENTION

This invention relates generally to harvesters and, more particularly, to raking and bundling crop material by using a cord knotter.

The terms "forward", "rearward", "left" and "right" when cited in connection with the baler and/or components thereof are determined with reference to, and by facing in, the direction of operative travel of the baler in the field. The leading and trailing ends of the bales are determined with reference to the direction of movement thereof in the bale chamber. Since during the formation of a bale the latter is advanced in a rearward direction of the machine through the bale chamber, the leading ends of the bales face rearwardly of the machine.

In conventional hay balers, hay, straw and similar crop material that has been previously cut, windrowed or swathed, is picked up from the ground by a pick-up unit and fed in successive batches or charges into an elongated bale chamber in timed sequence with a reciprocating plunger. The plunger compresses the material into bales and, at the same time gradually advances the bales towards the outlet of the bale chamber. As the bales reach a predetermined length as determined by a metering device, a knotter is actuated which wraps cord, twine or other flexible tie material around the bale and secures the ends of the material together.

In a typical baler a knotter is mounted on the bale chamber above a slot therein, the knotter comprising a twine holder from which twine extends to encircle a bale. During the baling operation, the leading strand of twine is held by the twine holder and extends forwardly across a twine retainer finger and a billhook and then in front of the bale. The twine retainer finger supports the strand so that it does not bear forcefully against the billhook. A needle is involved in completing the encirclement of twine around the bale and when advancing, the needle lays a trailing strand across the twine retainer finger, billhook and twine holder. A twine finger captures these strands of twine and positively positions the strands against the heel of the billhook. Thus, there are presented in a certain zone a pair of twine portions or strands lying alongside each other and these portions are twisted into a bight by the billhook and a portion thereof is partially pulled through the bight to form a bow knot. On completion of the operation of the knotter, the twine finger returns to the initial position. The removal of the tied knot from the billhook involves mechanical stripping by a movable member which normally embodies a knife operable to cut the twine from the twine supply so that the tied bale is complete in itself. The tying mechanism thus includes several components working in a precisely timed relationship so that theoretically the mechanism ties one knot for each bale and prepares the twine for the succeeding bale.

A knotter is inherently a relatively complicated structure, and the precisely timed operation thereof suffers at times from faulty operation. This may be due to the vibrations of the baler, the tension in the twine and the jarring of the baler as it moves through the field. The crop may be tough or resilient causing the strands of twine to jump about. Variations in the baling twine also effect the knotting operation. Balers are operated outside and often parked in the field, whereby the knotter is exposed to all weather conditions. Also, the knotter is subjected to dirt, crop and debris resulting in abrasion and interference of operation.

At present, balers are capable of reasonably efficient operation at speeds up to a maximum of approximately eighty to ninety strokes per minute of the baling plunger. One reason for this limitation on the operation speed is that the presently available knotter cannot perform the complex tying operation at faster speeds, as the latter operation must be carried out in timed sequence with the strokes of the baling plunger. Restraint on faster knotter operation is imposed by various cam and cam followers, complicated knotter drive means, and other oscillatory parts employed in a typical knotter which give rise to relatively high inertia forces.

Adjustments of presently available knotters are critical with field adjustments often necessary to compensate for wear, type of twine, and operating conditions. Such adjustments occasionally require skill beyond that of the average operator, causing expensive harvesting delays.

During the knot tying operation, the billhook normally pulls a predetermined length of twine for the knot to be formed therein, part from the twine holder and in part from around the bale just formed. In case bales at high density are formed, pulling twine from around the bale just formed is difficult to accomplish. This, in any way, results in heavy loads on both the billhook and the twine holder. However, this also results in more twine length being pulled from the twine holder and occasionally it may happen that there is insufficient length of twine to produce a full size bow knot. Instead thereof, the ends of twine are pulled fully through the bight formed on the billhook and as such a double overhead knot is formed, which is not as strong a knot as a bow knot. Occasionally, it even may happen that there is insufficient length of twine in the twine holder to the extent that this twine is pulled loose from the twine holder even before the knot is actually formed. This, of course, results in a mistie.

The foregoing illustrates limitations of the known prior art. Thus, it is apparent that it would be advantageous to provide an alternative directed to overcoming one or more of the limitations as set forth above. Accordingly, a suitable alternative is to provide a knotter apparatus having an intermittent drive means operably interconnecting a twine holder shaft and a billhook shaft.

SUMMARY OF THE INVENTION

In one aspect of the invention a knotter is provided comprising a twine holder, operable to hold during a knot-tying operation, a primary portion and a second portion of twine in which a knot is to be tied. A frame supports first and second rotatable shafts. A plurality of flanges are mounted on the first shaft and a billhook is angularly mounted on the second shaft. A plurality of twine holder fingers are pivotally supported by the frame and are resiliently urged relative to the flanges. Drive means are provided to permit the second shaft to intermittently drive the first shaft.

The foregoing and other aspects will become apparent from the following detailed description of the invention when considered in conjunction with the accompanying drawings. It is expressly understood, however, that the drawings are not intended as a definition of the invention but are for the purpose of illustration only.

BRIEF DESCRIPTION OF THE DRAWINGS

In the drawings:

FIG. 3 is a partial view taken along the line III—III of FIG. 2.

FIG. 4 is a sectional view taken along the line IV—IV of FIG. 3.

FIGS. 9 and 11 illustrate portions of an embodiment of the knotter billhook.

FIG. 10 is a view taken in the direction of line X—X of FIG. 9.

FIG. 16 illustrates a further knotter component indicated at XVI in FIG. 5.

FIG. 17 is a side view taken in the direction of arrow XVII in FIG. 16.

FIG. 18 is a sectional view taken along the line XVIII—XVIII in FIG. 6.

FIGS. 23 and 24 illustrate the knotter billhook in two different positions during the knotting cycle.

FIG. 25 is a side view taken along the line XXV—XXV in FIG. 24.

FIG. 26 is a top view illustrating an embodiment of a section of the bale chamber top wall in the vicinity of the knotter.

FIG. 27 is a sectional view taken in the direction of line XXVII—XXVII in FIG. 26.

DESCRIPTION OF THE PREFERRED EMBODIMENT

Figure 1:
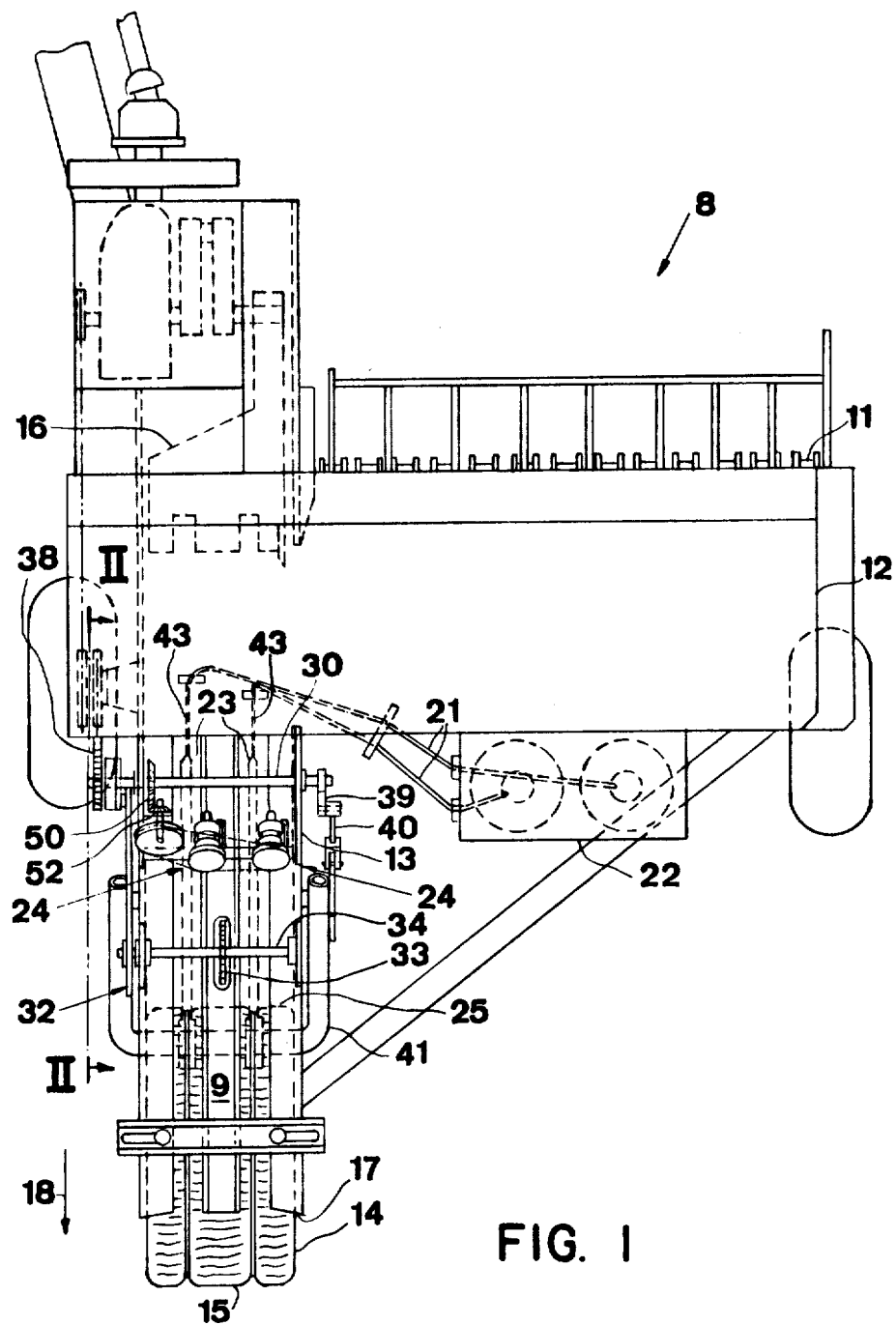
FIG. 1 is a top view illustrating an embodiment of a baler including two knotters according to the invention.

A typical agricultural baler, generally designated at 8, is shown in FIG. 1 to include a wheel supported chassis upon which are mounted a pickup mechanism 11, a feeder mechanism 12 and a bale chamber 13. As cut crop material is picked up from the ground, it is fed in successive batches or charges into the inlet of the bale chamber 13 and the batches of material are compressed into bales 14 by a reciprocating plunger 16 which also advances the bales along the chamber 13 towards an outlet 17 in the direction of arrow 18.

Figure 2:
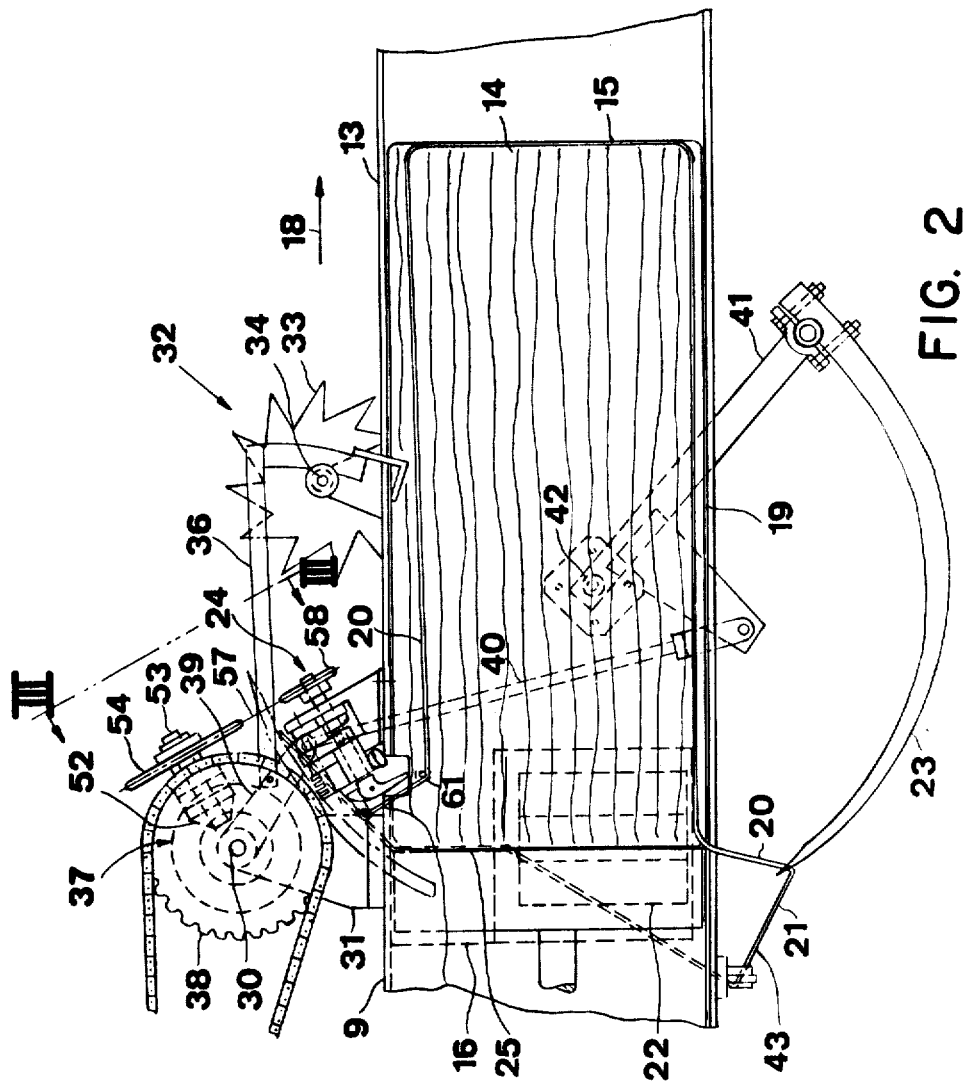
FIG. 2 is a sectional view taken along the line II—II of FIG. 1.

As can perhaps best be seen in FIG. 2, a primary portion or length 20 of twine or flexible material 21 extends across the bale chamber 13 in the path of the leading end 15 of each bale 14 from a supply reel or container 22 and passes through the eye of a needle 23 with the primary portion 20 of the twine 21 being held in a knotter 24 mounted on a top wall 9 of the bale chamber 13. The bale carries a pair of identical knotters 24 and each knotter is arranged to cooperate with a needle 23, whereby a pair of needles also has to be provided.

A main drive shaft 30 (FIGS. 2, 3, 4) is rotatably journalled in supports 31 on the upper wall of the bale chamber 13 at a distance thereabove and transversely of the bale chamber. The main drive shaft 30 is intermittently actuated by a conventional trip mechanism 32 which includes a starwheel 33 arranged to engage the bale of hay or other material as it is being formed, whereby it is rotated about a shaft 34 as the bale 14 moves along the chamber 13. The shaft 34 is operatively coupled to a trip lever 36 which itself is connected to a clutch mechanism 37 mounted on the main shaft 30. One half of the clutch mechanism 37 is driven continuously through a chain or sprocket drive transmission from an intermediate shaft on the baler, only a sprocket 38 thereof being shown in FIGS. 2 and 3.

The diameter of the starwheel 33 and the transmission ratio between the shaft 34 and the trip lever 36 are such as to allow the formation of a bale of predetermined length before the trip mechanism actuates the clutch mechanism 37, whereupon the main shaft 30 is driven to initiate the tying of a knot by each knotter 24. The main shaft 30 has a crank arm 39 attached thereto at its end opposite to the clutch mechanism 37, the arm 39 being connected by a pitman or link 40 to a needle frame 41 which carries the pair of needle 23. The needle frame 41 is pivotally mounted on the bale chamber 13 by bearings 42. The bale chamber 13 has a pair of longitudinal slots in its lower and upper walls to accommodate the needles 23 when pivoted to their full throw positions.

No further elaboration will be given concerning the structural details of the trip mechanism 32 and the needle frame and drive mechanism as those details are sufficiently well known in the art. Suffice it briefly to summarize the operation thereof. Upon actuation of the clutch mechanism 37, the main shaft 30 is driven, and the needles 23 move from the rest position (indicated by full lines in FIG. 2) to their full throw position (shown partially in phantom lines in FIG. 2) to wrap the respective twines 21 around the bottom and trailing ends 19 respectively 25 of the bale 14 and place the secondary portions 43 of the twines in the respective knotters 24. Each twine 21 loops back over the needle 23 to the reel 22 in the full throw position, thereby leaving a new primary portion or length of twine 21 across the path of the next bale to be formed. As each needle 23 returns to its rest position, the ends of each primary and secondary portion, 20 and 43, are twisted and tied together by the knotter 24, with the primary and secondary portions 20 and 43 being severed at the end of the tying operation. The entire knotting or tying operation takes place between successive strokes of the baler plunger 16.

The main shaft also has attached thereto a single conical gear segment 50 having teeth 51 over only about ⅓ of its circumference. The gear teeth 51 are arranged to mesh with the teeth of a conical gear 52 which is mounted on one end of a stub shaft 53 on the other end of which is mounted a sprocket 54. The shaft 53 is journalled in a support 56. A chain 57 engages the sprocket 54 and sprockets 58 and 59 of the respective knotters 24.

As already stated, the two knotters 24 are identical and, therefore, only one will be described in further detail in relation to the associated needle 23 and other components.

Figure 6:
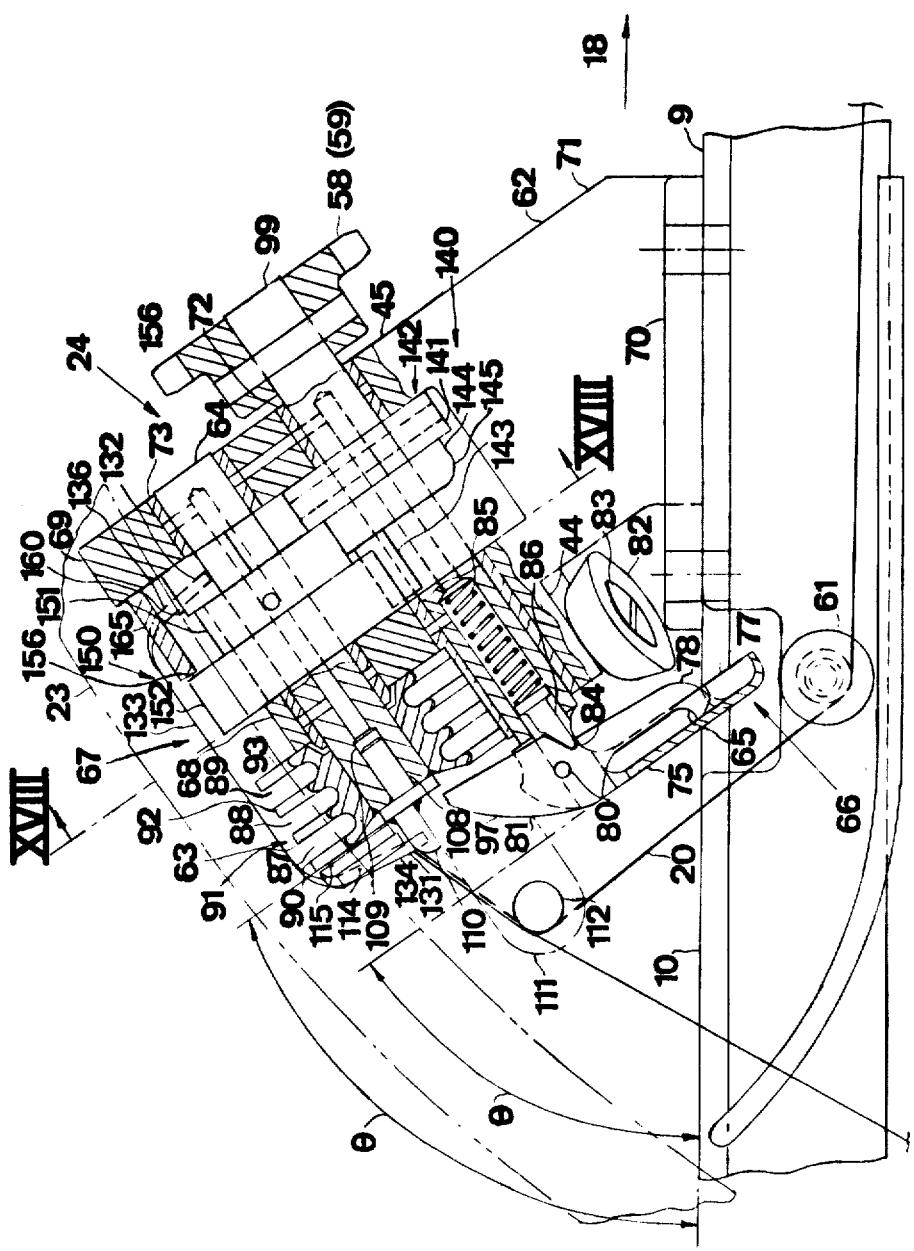
FIG. 6 is a sectional view taken along the line VI—VI in FIG. 5.
Figure 7:
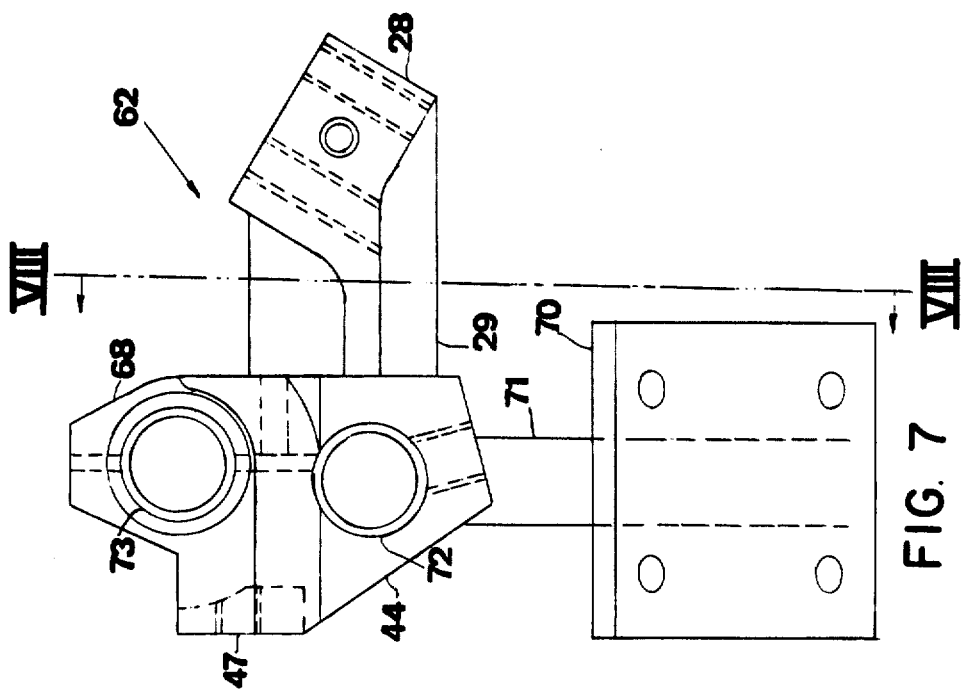
FIG. 7 illustrates the knotter frame and is taken in the same direction as FIG. 5.

By way of general introduction to the knotter structure, attention is directed to the cross sectional view of FIG. 6 in which the basic component parts, and their interrelationships can be seen. Each knotter 24 is mounted to the top wall 9 of the bale case 13 adjacent an elongate aperture 10 and in the vicinity of the twine guide rollers 61 (FIG. 6). The knotter includes a base or support frame 62, a twine holder 63 rotatably mounted by a twine holder shaft 64 on the support frame 62, a billhook 66 including a hollow shaft 99 extending parallel to the twine holder shaft 64 and rotatably supported on the support frame 62 and a "Geneva mechanism" 67 between the billhook shaft 99 and the twine holder shaft 64.

As clearly seen in FIG. 6, the twine holder 63 is maintained at an angle $\theta$ relative to the top wall of the bale chamber 13. Though further discussion will be given below, it should be appreciated at this time that $\theta$ is an acute angle and allows for a better placement of the twine in the twine gripping area 180 of the twine holder 63 by the needle 23. Also, as can be seen in FIG. 6, the billhook 66 is oriented at the same acute angle $\theta$ relative to the top wall of the bale case and is disposed closely adjacent the underside of the twine holder 63. This parallel relationship between the twine holder 63 and the billhook 66 permits the billhook 66 to be better disposed for the knot tying operation. The following is a more detailed description of the structural configuration of the knotter 24 and the important interrelationships of the parts.

The support frame 62 includes a generally horizontal bottom plate 70 (FIGS. 5 and 6) which is adapted to be removably affixed to the top wall 9 of the bale chamber 13. An upright member 71 is welded or otherwise secured to the bottom plate 70 and carries twin cylindrical bearing sleeves 72, respectively 73, the one disposed vertically above the other and both extending parallel to each other and in a generally fore-and-aft direction and inclined at an angle of about 30 to 35 degrees to the bale chamber top wall 9, with the rear end of the twin bearing sleeves 72,73 being positioned at a higher level above the chamber top wall 9 than the forward end. The twin bearing sleeves 72,73 comprise forward and rearward sections 44,45 respectively 68,69 spaced from each other and defining therebetween a free space 46. A coupling piece 47 connects the forward and rearward sections 44,45 and 68,69 of the twin bearing sleeves 72,73 at a location offset to the right of said sleeves as seen in the fore-and-aft direction of the baler. Bushings are pressed in the bearing sleeve sections 44,45; 68 and 69.

A further support member 28 is provided at a distance to the left of the forward section 44 of the twin bearing sleeve and is coupled to said forward section 44 by a coupling member 29.

Each knotter comprises an actual knotter mechanism or billhook, indicated generally at 66, with which is associated a hollow billhook or twister shaft 99 rotatably journalled in the sleeve sections 44,45 of the lower bearing sleeve 72. The twister shaft 99 supports at one end the associated driving sprocket 58 or 59. The billhook 66 comprises a fixed jaw 75 inclined at about 90 degrees to the end of the twister shaft 99 opposite to the sprocket 58 or 59 and adjacent, on the one end, the aperture 10 in the top wall 9 of the bale chamber 13 and, on the other hand, a twine holder of the knotter which is generally indicated at 63. In the rest position, the billhook 66 projects downwardly towards and partially through the aperture in the top wall 9 of the bale chamber 13 (as can be seen in FIG. 6). The fixed jaw 75 has an elongated body which is wider than it is thick and has a bent tip portion 76 which, in the rest position, extends transversely of the bale chamber 13. The fixed jaw 75 has a length which is in the range of 5 to 6 cm.

At the side facing the twister shaft 99, the fixed jaw 75 comprises an elongated groove or recess 77 for receiving a crochet hook 65 of a movable jaw 78 of the billhook 66. At the junction of the fixed jaw 75 and the twister shaft 99, the fixed jaw 75 is provided with an elongated slot 79 through which the movable jaw 78 extends and in which it is pivotally mounted by a pivot pin 80. The movable jaw 78 has at one end a heel portion 81 which acts as a cam follower with respect to the roller cam 82 as the twister shaft is rotated. The roller cam 82 comprises a part-spherical surface and is freely rotatably mounted on the knotter frame 62 at the lower and forward end of the front sleeve section 44 by means of a stub shaft 83.

The movable jaw 78 further also comprises a recess or notch 84 in the side opposite to the fixed jaw 75 at a location slightly offset relative to the pivot 80. A mechanism for spring loading the movable jaw 78 is provided inside the hollow twisted shaft 99 whereby the jaw is urged to the closed position. Referring to FIG. 6, the mechanism comprises a spring 85 inserted in the hollow shaft 99 and abutting at one end against the end of the bore and at the other end against an abutment member 86. The abutment member 86 has an angled end adapted for engagement with the notch or recess 84 in the movable jaw.

It will be noted that the fixed jaw 75 has smooth, rounded surfaces at 55 and at the connection between the billhook and the twister shaft. The movable jaw 78 has rounded edges as well as the heel portion 81 thereof, as at the opposite lip portion 35 as indicated in FIG. 11.

The twister shaft 99 carries intermediate the sleeve sections 44,45 of the twister shaft bearing sleeve 72 one half of the Geneva drive mechanism 67 which is intended for driving the twine holder 63. This Geneva drive mechanism will be described in more detail.

The twine holder 63 itself comprises four generally triangularly shaped flanges or discs 90,91,92 and 92 which are spaced from each other by respective spacers 94,95 and 96 which define with the flanges, respective slots or grooves 87, 88 and 89 of varying depth. The flanges or discs 90,91,92 and 93 are of the same size which, in comparison with known twine discs, are relatively small. Indeed said flanges have side edges measuring in the range of 4 to 5 cm only. The flanges have slightly rounded corners at 98 and comprise adjacent said corners, V-shaped recesses or notches 100. One V-shaped recess 100 is provided adjacent each corner in the side of the triangular shape, which, as seen in the direction of rotation 101 of the twine holder 63, leads said associated corner 98. The recesses 100 have a smaller depth than the grooves 87,88 and 89 between the adjacent flanges 90,91,92 and 93 at the location where said recesses 100 are provided. The V-shaped recesses 100 have their open ends facing more or less in the direction of rotation 101. All edges of said recesses are rounded to avoid inadvertent twine cutting or damage to the twine as said twine is caused to slide therealong.

Figure 8:
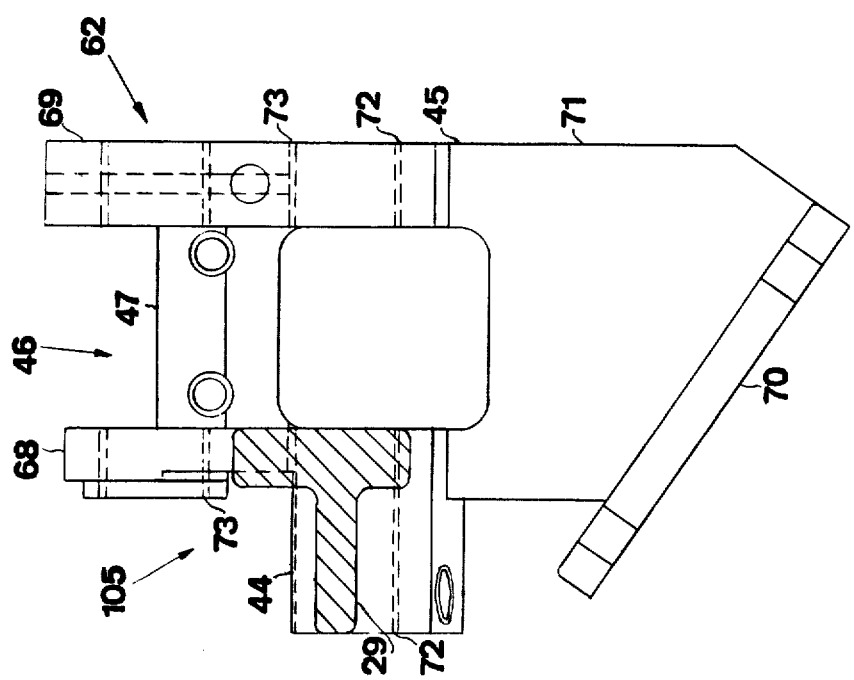
FIG. 8 is a sectional view taken along the line VIII—VIII in FIG. 7.

The flanges or discs 90,91,92 and 93 together with the spacers 94,95 and 96 are welded or otherwise secured to the twine holder shaft 64 in a manner so that they extend fully parallel to each other with the corners 98 and recesses 100 aligned to each other and in the direction of the twine holder shaft 64. Thus the recesses 100 in the adjacent flanges 90 to 93 define three grooves 102,103 and 104 which are oriented parallel to the twine holder shaft. The twine holder flanges 90 to 93 are positioned forwardly of the front face of the section 68 of the twine holder bearing sleeve 73 on the one hand and rearwardly of the plane of ration of the billhook 66 on the other hand. To this end, the forward section 44 of the billhook shaft bearing sleeve 72 is made substantially longer than the forward section 68 of the twine holder shaft bearing sleeve 73, thus providing a free space 105 (FIG. 8) above a portion of the billhook bearing sleeve section 44.

The fixed jaw 75 of the billhook 66 is dimensioned and positioned relative to the twine holder flanges 90 to 93 so that upon rotation said fixed jaw 75 moves in front of the twine holder 63 whereby, as seen in the direction of the billhook shaft 99, the plane described by the billhook 66 substantially overlaps the twine holder 63.

Figure 13:
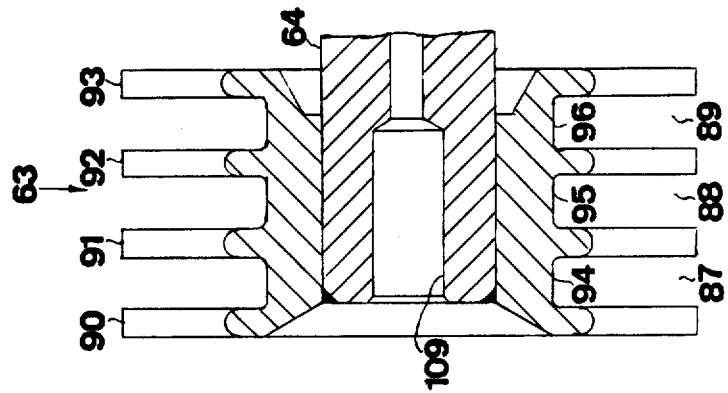
FIG. 13 is a sectional view taken along the line XIII—XIII in FIG. 12.
Figure 12:
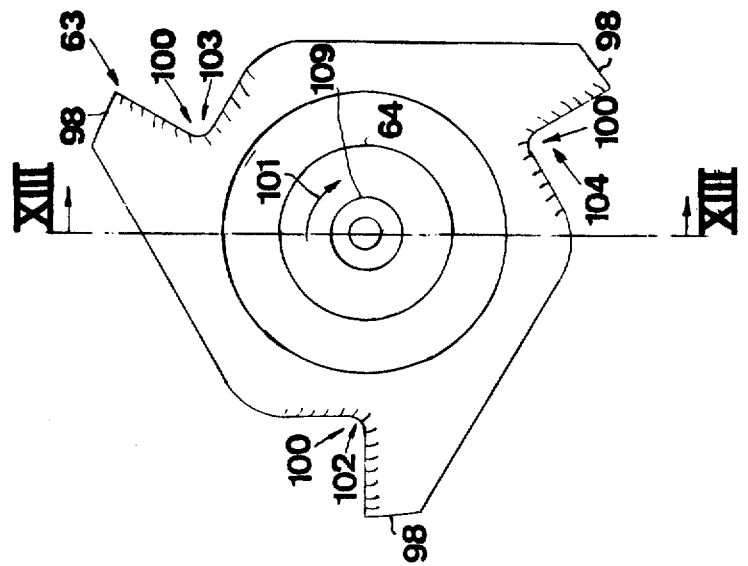
FIGS. 12 and 14 illustrate an embodiment of knotter twine holder components.
Figure 14:
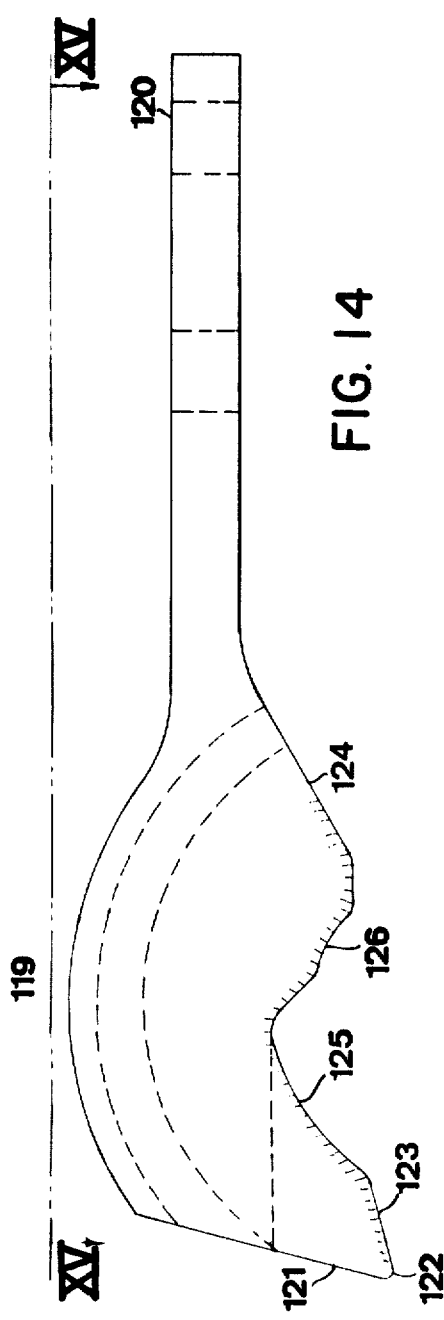
Figure 15:
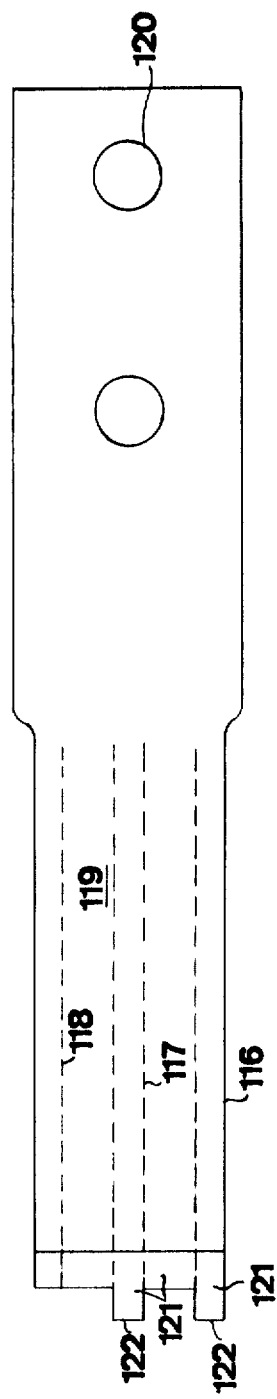
FIG. 15 is a view taken along the line XV—XV in FIG. 14.

A knife arm 106 for the twine holder 63 is bolted at 107 to the further support member 28 of the frame 62 and extends upwardly and sidewardly from its fixation point 107 to a location in front of the center of the twine holder 63, at which location a mounting pin 108 is provided which extends coaxially with the twine holder shaft 64 and which fits in a bore 109 (FIGS. 12, 13 therein). This pin 108 thus together with the bolt 107 helps holding the knife arm 106 in position.

The knife arm 106 is further extended to the right beyond the center of the twine holder 63 for forming at this location a first stationary twine guide 110 in front of the twine holder 63. Said first stationary twine guide 110 is positioned so that the top of the billhook 66 can pass in front thereof during rotation and comprises forward rounded edges as can be best seen in FIGS. 16–17.

A further support member 111 (FIG. 17) projects forwardly from the knife arm 106 at a location adjacent the fixation point 107 for carrying adjacent its free end a second stationary transverse twine guide 112. This second twine guide 112 is positioned slightly lower than the first twine guide 110 and also further to the front to the extent that during operation the billhook 66 passes between said first and second twine guides 110 respectively 112. This second twine guide 112 has a downwardly bent free end 113 which is positioned inwardly of the turning circle of the top 76 of the billhook 66 (when seen in the direction of the billhook shaft 99). The second twine guide 112 preferably is formed by a rod of circular section.

Attached to the first twine guide 110 and in shearing contact with the underside of the lower twine holder flange 90 is a stationary knife 114 having a cutting edge 115 which is inclined at a positive angle relative to the radius of the twine holder 63 when seen in the direction of rotation 101 of said twine holder.

Figure 5:
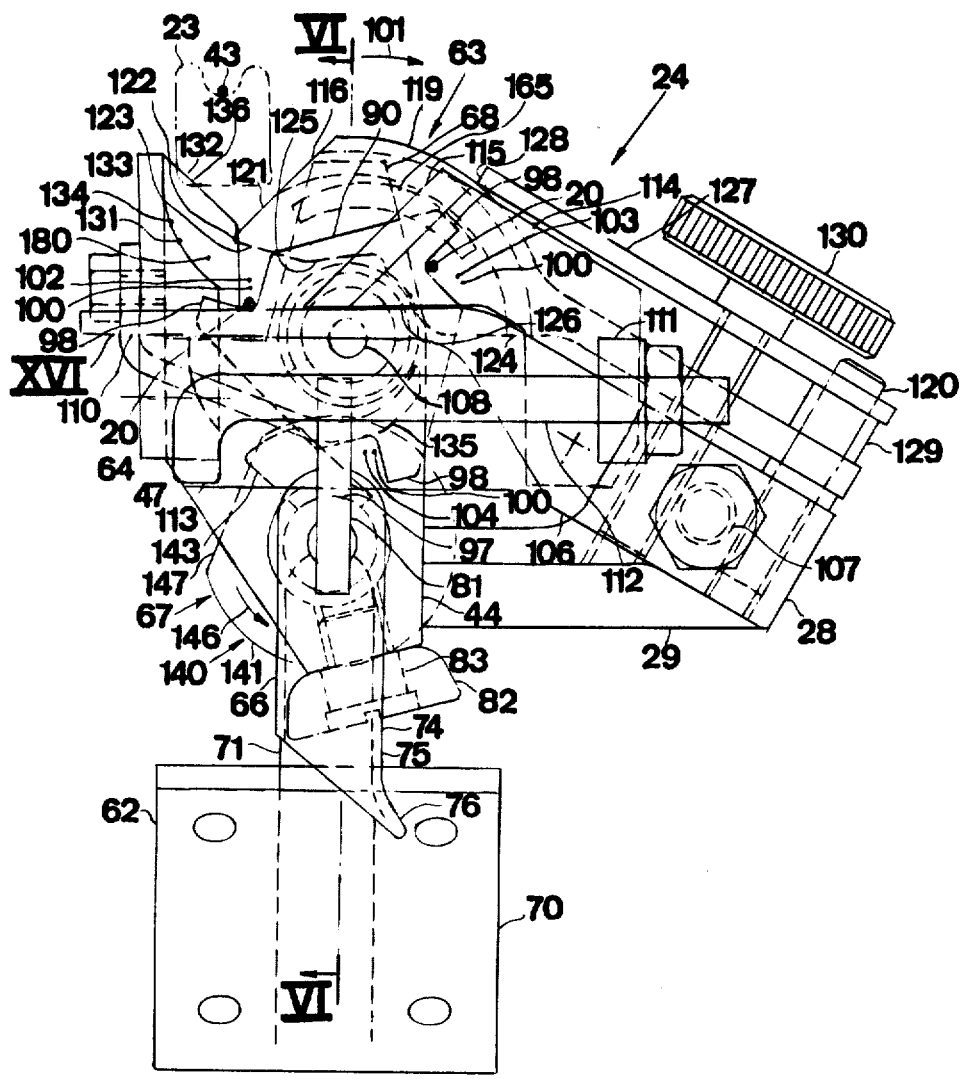
FIG. 5 is a view illustrating an embodiment of the knotter apparatus of the invention and taken in the direction of the billhook shaft.

Twine retainer fingers 116,117,118 which are integrally connected at one end by a mounting member 119 are pivotally mounted via said member 119 at 120 to the further support member 28 of the frame 62. The mounting member 119 and the twine retainer fingers 116,117,118 extend from the pivot 120 in a transverse direction across the twine holder 63 and extend in part into the grooves 87,88 and 89 respectively. The transverse mounting member 119 and the fingers 116 and 117 have an inclined edge 121 opposite the pivot which edge acts as a twine guide, assisting in positioning of the secondary portion 43 of the twine in the groove 102 as seen in FIG. 5. The edge 121 partly defines a generally hooked end 122 of the finger which, at least in the lower finger 116 has a straight edge 123 which also acts as a twine guide. The edges of the fingers 116,117 and 118 facing towards the twine holder 63 and extending between the flanges thereof each comprise a straight section 124 and a curved section 125, separated by a curved section 126 of a smaller radius than section 125. The fingers 116,117,118 are resiliently urged into the grooves 87,88,89 by a leaf spring 127 which also is pivotally mounted on the pivot 120 and which extends in the direction of the fingers 116,117,118 and contacts the mounting member 119 at 128. A spacer 129 is provided between the mounting member 119 and the leafspring 127 and coaxially with the pivot 120. An adjustable screw 130 mounted on the further support member 28 between the pivot 120 and the contact point 128, provides adjustment of the pressure exerted by the spring 127 on said twine fingers 116,117 and 118.

A third and fourth stationary guide member 131, respectively 132, are integrally coupled to each other by a connecting piece 133 which is attached to the coupling piece 47 of the frame 62. The third stationary guide member 131 has a curved guiding edge 134 extending generally in a plane parallel to and closely adjacent the front edge of the lower twine holder flange 90. Together with the inclined edge 121 on the twine fingers 116,117, this guide edge 134 forms a generally V-shaped pattern (when seen in the direction of the billhook shaft) having its apex generally at the groove 102 in the twine holder 63. This guiding edge 134 and the inclined edge 121 cooperate to direct twine inwardly towards the twine gripping area 180 defined by the groove 102 and the twine fingers 116,117.

A set of spaced apart twine disc cleaners 135 (three in total, so that one cleaner is provided in each of the grooves 87,88 and 89) of a generally spiral shape and extending from the connecting piece 133 gradually into the grooves 87,88 and 89 have their free ends engaging the spacers 94,95 and 96 in said grooves so as to remove any material therein and direct it away from the knotter.

The fourth stationary guide member 132 equally has a curved guide edge 136 which is disposed in a plane in the vicinity of the front face of the rearward section 69 of the bearing sleeve 73 and which leads to the free space 46 between the front and rear sections 68,69 of said bearing sleeve 73.

All twine guide edges of the stationary twine guides 110,112,131 and 132, the twine holder flanges 90, 91,92, and 93 and the twine fingers 116,117 and 118 which are contacted by the baling twine are rounded so as to avoid twine damage and inadvertent twine cutting.

The Geneva drive mechanism 67 disposed in the free space 46 and drivingly coupling the billhook shaft 99 to the twine holder shaft 64 will now be described in greater detail. Such type of drive mechanism is, however, generally known in the art of intermittent drive mechanisms.

On the billhook shaft 99, the driving part 140 is keyed comprising basically a cylindrical body 141 which is part of a lock mechanism 142, and an eccentric driver cam 143 secured thereto.

The eccentric driver cam 143 is facing in the direction of the billhook and is spaced from the cylindrical body 141 by a spacer body 144 with rounded edges 145 at the side of the driver cam and of a slightly smaller diameter than the cylindrical body 141. At a location forwardly of the driver cam 143, when seen in the direction of rotation 146 of the billhook shaft 99, a section of the cylindrical body 141 and of the spacer body 144 has been cut away (at 147) for reasons which will become clear further on. The driver cam 143 has a rounded driving surface 148 suitable to drivingly engage the driven part 150 on the twine holder shaft 64.

Figure 20:
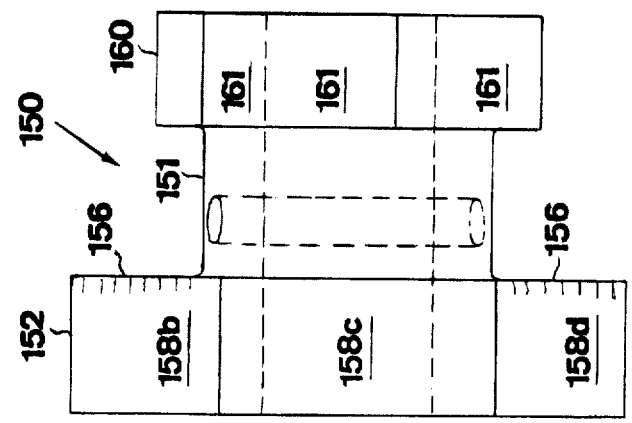
FIG. 20 is a view taken in the direction of line XX in FIG. 19.
Figure 19:
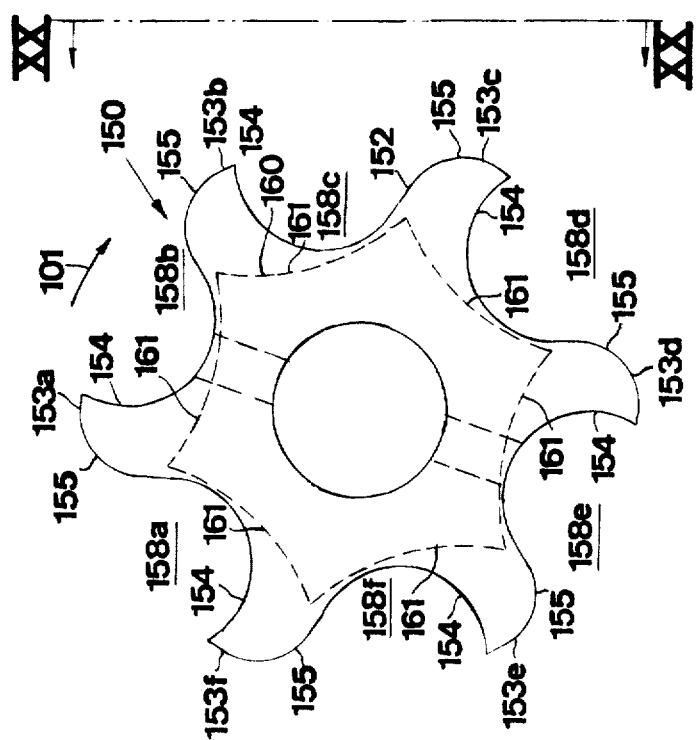
FIG. 19 illustrates the component indicated at XIX in FIG. 18 on a larger scale.
Figure 22:
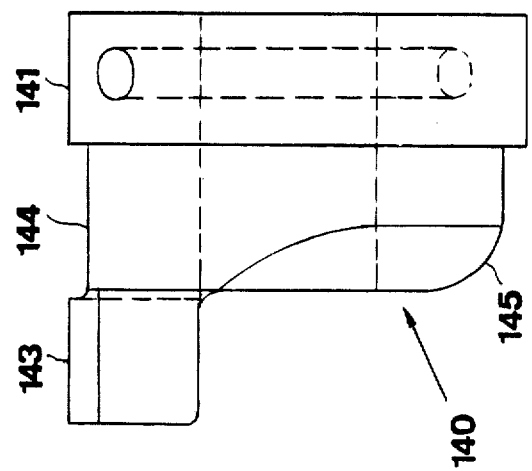
FIG. 22 is a side view taken in the direction of line XXII in FIG. 21.
Figure 21:
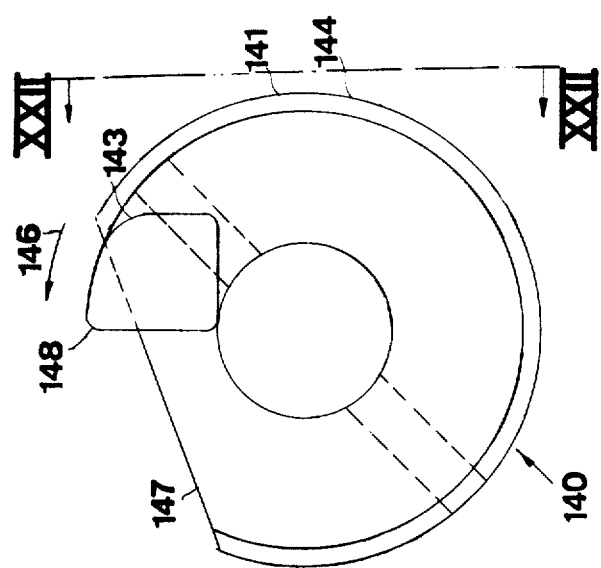
FIG. 21 illustrates the component indicated at XXI in FIG. 18 on a larger scale.

The driven part 150 of the Geneva drive mechanism 67, which is keyed on the twine holder shaft 64 basically comprises two starwheel components spaced apart by a spacer body 151 of reduced diameter. The front starwheel component 152 is adapted to be drivingly engaged at intervals by the driver cam 143 and comprises to this end six equally angularly spaced legs 153 having convex-curved sides 155 engageable by the convex-curved driving surface 148 of said driver cam 143. The sides 154 opposite to the convex curved sides 155 have a concave shape. Between the legs 153, pockets 158a through 158f are formed. The side edges 156 of the legs 153 facing away from the twine holder 63 are rounded for avoiding inadvertent twine cutting and twine damage as baler twine is slided therealong (FIGS. 19 and 20). Indeed, and as will be explained in more detail, the starwheel component 152 not only acts as a drive transmission component, but also acts as a twine guide.

The rear starwheel member 160, which is part of the lock mechanism 142 is differently shaped and comprises six concaved sides 161 which are shaped and dimensioned so that each of these sides may engage the cylindrical body 141 on the billhook shaft 99 whereby rotation of the twine holder shaft 64 is made impossible. Thus, in other words, when any of the concaved sides 161 engages the cylindrical body 141, the twine holder flanges 90 to 93 are firmly locked and can only be rotated after the billhook 66 and the cylindrical body 141 on the billhook shaft 99 have been rotated to the extent that the release surface 147 of the locking member 141 is facing the starwheel member 160, as in this position, the stars of said starwheel member 160 are free to move beyond said surface.

As seen in FIG. 19 the rear starwheel member 160 is slightly angularly offset to the front starwheel member 152. It will be clear from what preceeds that rotation of the driver cam 143 in the direction 146 will cause rotation of the twine holder shaft 64 in the opposite direction 101.

Finally a fifth stationary guide member 165 is attached to the rearward section 69 of the bearing sleeve 73 and extends in a direction generally parallel to the twine holder shaft 64 into the vicinity of the rear side 156 of the front starwheel member 152 thus overlying the rear starwheel member 160 and the spacer body 151. At its forward edge, this guide member 165 is arcuate in shape and has a width and is positioned so that said forward edge reaches from behind the top leg 153 (when the knotter is in its rest position) of the forward starwheel 152 to a location behind the next preceding leg 153 of the same.

A straw deflector 170 is provided on the inner side of the bale chamber topwall 9 in the vicinity of each knotter and at the section of the elongate aperture 10 rearwardly of the point where the associated needle is intended to project through. Said deflector 170 comprises generally elongate and vertical wall sections 171 provided at the opposite sides of said elongate aperture 10 and reaching over a predetermined depth into the bale case. One of these vertical wall sections 171 rotatably carries the twine guide roller 61 mentioned before. A generally horizontal wall section 172 is attached to the lower edge of the vertical wall section 171 carrying the roller 61 and reaches into the vicinity of the other vertical wall section 171, leaving only an elongate aperture 173 of reduced width therebetween. This horizontal wall section 172 thus shields the twine guide roller 61 from the bale chamber and prevents baled crop material from fooling said roller.

The horizontal wall section 172 has a tapered and upwardly curved leading end 174 which is positioned slightly rearwardly of the location in the aperture 10 where the needle is intended to project through. The edge 175 of this tapered end portion 174 acts as a stationary twine guide, leading twine into the space defined by the vertical and horizontal wall sections 171,172 in a manner as will be described.

This leading edge 175 together with the edges of the wall sections 171,172 defining the elongate aperture have been rounded off to avoid twine damage and twine cutting when twine is caused to slide therealong.

Figure 28:
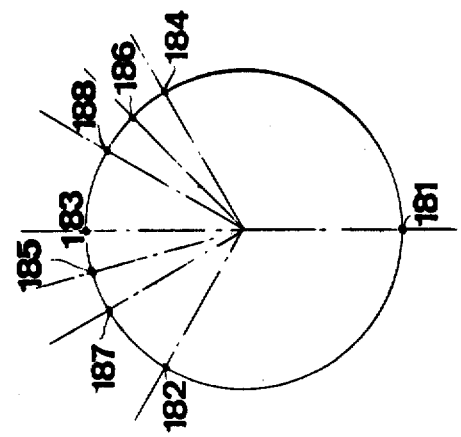
FIG. 28 is a diagram illustrating an embodiment of the knotter drive.

Upon rotation of the main shaft 30, the needles 23 move from their rest position to their full throw position during the first 180 degrees of rotation of the main shaft. During the next 180 degrees the needles are fully retracted. The conical gear segment 50 on the main shaft 30 is dimensioned and positioned so that during the first 120 and the last 120 degrees of rotation of the main shaft 30, the knotters 24 are not actuated. The knotters are driven only during the second 120 degrees of rotation of the main shaft 30, that is from the moment the needles 23 have come in the vicinity of said knotters over their full stroke position to the point where they move away from the vicinity of said knotters. FIG. 28 schematically shows the cycle of 360 degrees of the main shaft 30. At 181, the needles 23 are in the rest position and at 183, said needles 23 are in the full throw position. At 182 the knotter drive is started while at 184 said drive is already terminated.

The transmission ratio between the main shaft 30 and the billhook shafts 99 is so that during the second 120 degrees of rotation of the main shaft 30, the billhooks make two complete revolutions of thus rotate over 720 degrees. Finally the Geneva mechanism 67 of each knotter 24 is arranged so that each billhook shaft 99 drives the twine holder shaft 64 over 60 degrees during the last quarter of each full revolution of the billhook. Thus, during one complete knotting cycle, the twine holder 63 is rotated twice over 60 degrees or in total over 120 degrees. This intermittent rotation of the twine holder 63 thus is obtained during the last 15 degrees of rotation of said main shaft 30 before the needles 23 reach their maximum stroke position and during the last 15 degrees of rotation of said main shaft 30 the drive of the billhook 66 is interrupted.

With the parts assembled as set forth above, the baler is moved across a field and crop material, such as hay, to be baled is picked up from the ground with the pickup mechanism 11 and is delivered thereby to the feeder mechanism 12 which in turn feeds the crop material in successive latches or charges into the bale chamber 13 in timed sequence with the reciprocating baler plunger 16. The plunger 16 compresses the crop material into a bale 14 and at the same time gradually advances the bale towards the outlet 17 of the baling chamber in the direction of arrow 18. As material is compressed in the bale chamber, the deflector members 170 form grooves in the bale 14 being formed for placement of the twine therein. The horizontal wall section 172 and the curved leading end 174 prevent crop material fooling the twine guide roller 61 and the billhook 66, as well as shifting the primary portion 20 of twine 21 in the one or other direction. As long as the clutch mechanism 37 is not actuated, all components of the knotters 24 are in their rest positions. This means that the needles 23 are in their lowermost dwell position, as shown in full lines in FIG. 2, while the billhook 66 projects downwardly as seen in FIGS. 2, 5, 6 and 18. As already mentioned a primary portion 20 of twine 21 extends across the bale chamber 13 in the path of the leading end 15 of the bale 14 being formed and passes through the eye of the needle 23, with the free end of the primary portion being supported in the twine holder 63 of the associated knotter 24, bearing in mind that two knotters are employed, whereby each bale 14 is bound by two pieces of twine. The free end of the primary portion 20 of the twine 21 is received in the groove 103 of the twine holder 63 at which point it is firmly held in position by the twine retainer fingers 116,117 and 118 between the curved sections 126 thereof with the smaller radius and the twine holder flanges 90 to 93. From said groove 103 said primary twine portion 20 extends away from the billhook 66 through the pocket 158c, around and behind the legs 153b and 153a and through the pocket 158a of the forward starwheel member 152. As such, it is clear that said twine portion extends below the fifth stationary twine guide 165. From thereon, the twine portion 20 extends down in a forward direction into the next groove 102 of the twine holder 63, down across the first and second stationary twine guides 110, respectively 112 and finally down and around the twine guide roller 61 into the bale chamber 13. This free end of the primary portion 20 of the twine 21 is tensioned and thus forcefully bears against all the components just listed above, whereby it is properly positioned relative to the billhook 66.

As a bale 14 is being formed and moved along the bale chamber 13, the starwheel 33 is rotated thereby and as the bale reaches a predetermined length, the wheel 33 actuates the clutch mechanism 37, whereupon the main shaft 30 is rotated through 360 degrees by the chain and sprocket drive mechanism. During the first 180 degrees of rotation of the shaft 30, the crank arm 39, the pitman arm 40 and the needle frame 41 are pivoted whereby the needles 23 move from their lowermost rest positions to their highest, full throw, positions (phantom lines in FIG. 2) through a path closely adjacent the first and second stationary guide members 110,112, through the twine gripping area 180 defined in part by the guide edge 134 of the third guide member 131 on the one hand and the inclined surface 121 on the other hand, and substantially parallel to the twine holder shaft 64.

Simultaneously, as is known in the art, the baler plunger 16 is moving towards its extreme material compressing position and, as the needles 23 move upwardly through the bale chamber 13, they pass through slots (not shown) in the face of the plunger 16, whereby the plunger holds the crop material to be baled, away from the needles 23 and thus enables a smooth and unobstructed passage from the needles 23 through the bale chamber 13 and prevents bending and/or breakage of the needles 23.

During the next 180 degrees of rotation of the main shaft 30, the needles 23 are retracted and returned to their rest or dwell positions. At the same time the plunger 16 is retracted. During the initial movement over 120 of the main shaft 30, the teeth 51 of the gear segment 50 are not in mesh with the teeth of the conical gear 52, whereby neither knotter 24 is operated.

During the initial movement of the shaft 30, each needle 23 carries the end of the secondary twine portion 43 from the position shown in full lines in FIG. 2 around the bottom and trailing ends 19 and 25 of the bale 14 to the position shown in phantom lines in FIG. 2. At that moment, the needle 23 places the secondary twine portion 43 alongside the primary twine portion 20 against the first and second stationary guide members 110 and 112 and in the groove 102 in the twine holder 63 and in the pocket 158a of the starwheel member 152. The third stationary twine guide 131 together with the inclined edge 121 help locating the secondary twine portion 43 in the twine gripping area 180 of the twine holder 63 and finally the groove 102. Finally the fourth stationary guide member 132 helps in leading the secondary twine portion 43 into the pocket 158a. At this point in the cycle, the groove 102 and the pocket 158a are positioned transversely offset to the right relative to the plane through the billhook and twine holder shafts, when seen in the fore-and-aft direction of the baler.

As the bale 14 being formed moves along the bale chamber 13 the secondary twine portion 43 (and also the primary portion 20 of the next bale) is caused to move along the curved leading end 174 of the horizontal wall section 172 in the bale chamber, whereby ultimately said secondary twine portion 43 is located within the elongate aperture 173. The primary twine portion 20 of the next bale ultimately is located in the same manner through said aperture 173 and still later said primary twine portion starts bearing against the twine guide roller 61 as said bales are moved along the bale chamber 13 to the outlet 17.

At the point 182 in the cycle of the main shaft 30, the gear segment 50 meshes with the conical gear 52 whereby the billhook 66 starts rotating. The billhook 66 has completed a full cycle of 360 degrees as the main shaft 30 reaches the position 183. During the first $\frac{3}{4}$ of the billhook cycle, that is, until the main shaft 30 reaches the position 185, the twine holder 63 remains inactivated. During the first half of the first cycle of the billhook (main shaft 30 moving from the position 182 to position 187) said billhook is moved to a position projecting inbetween the first and second stationary guides 110,112. At this point, the heel 81 of the movable jaw 78 has engaged the roller cam 82, whereby the billhook 66 is opened against the spring load of the coil spring 85 in the hollow twister shaft 99. However, at this point in the first cycle of the billhook no strands of twine are presented in a manner to be caught between the fixed and movable jaws 75, respectively 78 and thus opening of the billhook 66 remains without effect.

During the third quarter of the first billhook cycle, that is when the main shaft 30 moves from position 187 to 185, the path of the billhook 66 intersects both twine portions 20 and 43, which, at this point in the cycle forcefully bear against the first and second twine guides 110,112, whereby said portions are brought together in case they were not yet placed together before. Also, during this third quarter of the first billhook cycle the billhook is closed again. Simultaneously, the billhook pushes both twine portions 20 and 43 to the right to the extent that they jump off the bent end 113 of the second twine guide 112. The bent tip portion 76 of the fixed jaw 75 ensures that both twine portions are positively caught and that none thereof escapes from the grip of the billhook 66. As the twine portions 20,43 jump off the bent end 113 of the second twine guide 112, said portions now project from the first twine guide 110, against the leading edge 74 and in the path of the fixed jaw 75 directly to the twine guide roller 61. The twine portions 20,43 are thus brought closer to the forward end of the knotter mechanism.

During the fourth quarter of the billhook cycle, that is when the main shaft 30 is moved from position 185 to position 183, billhook 66 starts looping the twine portions 20,43 around its fixed and movable jaws 75,78 on the one hand, and the twine holder 63 is rotated over 60 degrees in the direction 101 on the other hand. For forming said loop additional twine length is required and this will be obtained after the twine holder has completed said first 60 degrees rotation, in a manner as will be described.

As far as the loop formation is concerned, continued rotation of the billhook 66 from its 270 degree position to its 360 degree position causes both twine portions 20,43 to slide along the billhook components in a manner so that, as the billhook reaches its 360 degree position, said twine portions extend from within the bale chamber 13 (twine portion 20 bears against the twine guide roller 61 and twine portion 43 bears against the rear end 25 of the bale 14 just formed), across the leading edge 74 of the fixed jaw 75, behind the movable jaw 78 and against the forward end of the twister shaft 99 at the right hand side thereof (as seen in the fore-and-aft direction of the machine) to the first stationary guide 110. This situation is shown in FIG. 23.

As said above, during the fourth quarter of the billhook cycle, the twine holder 63 is rotated over 60 degrees, as a result of which the primary and secondary twine portions 20,43 positioned in the groove 102 of the twine holder are caused to move in the same direction and towards the twine retainer fingers 116,117,118. The guide edges 123 on the twine retainer fingers 116,117,118 wedge the twine portions between said fingers and the flanges 90, 91,92,93. As the twine holder 63 is approaching its intermediate position (after 60 degrees rotation) the twine portions are strongly caught and held between the low pressure arcuate sections 125 of the twine retainer fingers and said flanges and only can slide therebetween under a substantial tensile load.

Actually sliding of the primary twine portion 20 is possibly only after the end thereof which previously was firmly held between the high pressure arcuate sections 126 of the twine retainer fingers 116,117,118 and the flanges 90,91,92,93 is released. However, this is accomplished shortly after both twine portions 20,43 get caught between the low pressure sections 125 of said fingers and said flanges, as at that moment said end of said primary portion is moved in the direction of the straight section 124 of the twine retainer fingers. Thus, as the loop formation around the billhook requires additional twin length, said primary and secondary twine portions 20 and 43 are caused to slide through the twine holder 63 as the billhook 66 exerts a substantial tensile load thereon. This condition is maintained until the twine holder 63 is rotated over a further 60 degrees and this does not occur until the last quarter of the second billhook revolution. In other words the further twine holder rotation only occurs when the main shaft 30 is rotated from the position 186 to the position 184.

As the primary twine portion is looped around the legs 153a and 153b of the forward starwheel 152 of the Geneva drive mechanism 67, which, as can be seen from the drawings is provided at a distance from the twine holder 63, a substantial twine length is available. As the second twine portion 43 is not yet cut at this point in the cycle, also sufficient twine length for the secondary twine portion 43 is available.

As the twine holder 63 is rotated in the direction 101, the leg 153 of the forward starwheel member 152 of the Geneva drive mechanism 67 is making the same angular displacement thus taking with it the secondary twine portion 43 which at that time in the cycle is located in the pocket 158a. After the 60 degrees cycle of the starwheel is completed, the the leg 153f is positioned in front of the fifth twine guide 165 (position 153a in FIG. 18) whereby the secondary twine portion 43 is thus trapped in the pocket 158a and below said guide 165.

Furthermore, as the twine holder 63 is completing its first 60 degrees cycle, both of the primary and secondary twine portions 20,43 are caused to slide transversely along the first twine guide 110 in the direction to the billhook 66, whereby, at the end of said cycle said twine portions are positioned against the heel portion 81 of the movable jaw 78 at the right hand side thereof in the position as shown in FIG. 23. This facilitates the completion of the loop formation during the next 180 degrees of the billhook 66 and as will be described.

Now, the Geneva drive mechanism 67 will be described in further details. FIG. 18 shows this mechanism in its rest position, that means, the position taken when the main shaft is at the position 182. It will be noted that in this position, one of the concaved sides 161 of the second starwheel member 160 of the lock mechanism 142 is positioned closely adjacent the cylindrical body 141, whereby said lock mechanism 142 is rendered operative and the twine holder shaft 64 is positively prevented from being angularly displaced, even when the twine portions 20,43 exert a substantial turning torque thereon. It will also be noted that rotation of the billhook 66 in the direction 146 remains possible.

As the billhook 66 is rotated from its 0 degree position to its 270 degrees position, the cylindrical body 141 of the lock mechanism 142 remains operative and the driver cam 143 remains inoperative. During the last quarter of the billhook cycle, the cut away section 147 of the lock mechanism cylindrical body 141 is presented to the second starwheel member 160 whereby the lock mechanism 142 is unlatched, thus permitting the twine holder shaft 64 to rotate. Also during this fourth quarter of the billhook cycle, the eccentric driver cam 143 enters the pocket 158d and engages the leg 153d of the forward starwheel member 152 thus causing the latter to rotate over 60 degrees in the direction 101. Thereafter the lock mechanism assumes again a locking position whereby rotation of the twine holder is again prevented.

At the end of the first cycle of the billhook 66 each needle 23 has reached its full throw position and is at the point of returning to its fully retracted or dwell position. The needles 23 reach their dwell positions when the main shaft 30 returns to its position 181. During this movement, each needle 23 carries a further portion of twine 43 down the trailing end 25 of the formed bale 14 and this twine portion becomes the primary twine portion for the next bale to be formed.

When the main shaft 30 has reached the position 184, the gear segment 51 passes beyond the conical gear 52, whereby drive to the knotters 24 is interrupted. Thus, further rotation of the main shaft 30 from the position 184 to the position 181 merely completes the retraction of the needles 23 to their dwell positions.

As the main shaft 30 moves from the position 183 to the position 186, the twister shaft 99 is rotated over $\frac{3}{4}$ of the second revolution of 360 degrees. During this portion of the cycle, the twine holder 63 remains inactivated. As the main shaft 30 moves from the position 186 to the position 184, the twister shaft 99 is completing the last revolution of the knotter cycle and the twine holder shaft 64 is rotated over a further 60 degrees. Thereafter the knotter components are positioned so that a further knotting cycle can be initiated as the next bale in the bale chamber is completed.

As the main shaft 30 moves from the position 183 to the position 188, the twister shaft 99 is rotated over the first 180 degrees of its second revolution. During the first 90 degrees, the lower parts of the twine portions 20,43 begin to slide over the leading edge 74 of the billhook 66 towards the base thereof. Simultaneously, the heel portion 81 of the movable jaw 78 hooks behind the upper parts of the twine portions 20,43 thus causing them to slide in the direction of the base of the billhook over the curved section 97 of the movable jaw 78. Continued rotation of the billhook shaft 99 towards the 180 degrees position results in a loop being completed around the billhook 66.

As the loop is being completed, the heel portion 81 of the movable jaw 78 contacts the roller cam 82 for the second time which opens the jaws 75 and 78 and the twine portions 20,43 are now in a position relative to the billhook 66 in which they can enter the open jaws as seen in FIG. 24. This is because the twine portions 20,43 no longer bear against the second stationary twine guide 112 but instead thereof only bear against the first stationary twine guide 110.

As the heel portion 81 moves off the roller cam 82 during movement of the twister shaft 99 from the 180 degrees position to the 270 degrees position, the jaw 78 is closed due to the action of the spring 85, whereupon the twine portions 20 and 43 are firmly clamped between the billhook jaws 75,78.

During the loop forming part of the cycle a substantial tensile force is exerted on the twine portions 20 and 43 causing them gradually to slip a limited amount between the flanges 90,91,92,93 and the associated twine retaining fingers 116,117,118. This is possible, as at this point in the cycle, said twine portions are held at the low pressure sections 125 of the twine fingers 116,117,118. This slipping is necessary in order to provide a certain additional twine length with which to form the knot, the appropriate length being determined by the curvature of the surface 97 of the movable jaw 78 and being sufficient not only to enable the knot to be tied but also for the knot to be loose enough (but not too loose) for it to be pulled from the billhook 66.

During the movement of the main shaft 30 from the position 188 to the position 184, the billhook 66 is rotated from its 180 degrees position to its 360 degrees position of the second revolution during which movement the loop of twine slides towards the top of the billhook 66 with the ends of the twine portions 20 and 43 still clamped between the jaws 75,78.

As the main shaft 30 moves from the position 186 to the position 184, that is, as the billhook shaft 99 completes the fourth quarter of its second revolution, the driver cam 143 of the Geneva drive mechanism 67 engages the leg 153c of the forward starwheel member 152 and simultaneously the cut away section 147 of the cylindrical body 141 of the lock mechanism 142 is again moved in the vicinity of the rear starwheel member 160, whereby the billhook shaft 99 causes the twine holder shaft 64 to rotate over another 60 degrees in the direction 101. As a result thereof a number of functions are accomplished simultaneously. First, the twine portions 20,43 in the groove 102 of the twine holder 63 are moved further in the direction 101 to the high pressure arcuate sections 126 of the retainer fingers 116,117,118 so that, as already explained, the grasp on the twine portions is increased substantially to the extent that the ends are no longer allowed to slide in between the various components, even under an increased tensile load.

As the twine holder 63 moves on to its next following rest position (which is reached when the groove 102 assumes the position of groove 103 in FIG. 5), the groove 102 holding the twine portions 20,43 moves past the fixed knife blade 114, whereby both portions of twine are severed, leaving the formed bale independent as such although the looped ends of the twine portions are still retained on the billhook 66. The cutting of the primary twine portion 20 gives rise to a short piece of waste twine and if it does not fall from between the flanges 90,91,92 and 93 during the formation of subsequent bales, the twine disc cleaners 135 will remove it. A clean cut of the twine portions 20 and 43 is obtained as at the moment of cutting, these portions are firmly held in the twine holder 63 by the finger sections 126 as described above on the one hand, and as the pull on said twine portions is even increased due to the downward pivotal movement of the billhook 66 on the other hand.

The billhook 66 thus moves to its rest position in timed sequence with the tail ends of the twine portions 20 and 43 being cut. In this position, the jaws 75,78 extend generally downwardly and rearwardly towards and partially through the aperture 10 in the bale chamber top wall 9. At this point in the tying cycle, the billhook 66 assumes an angle $\theta$ to the horizontal which is in the range of 50 to 60 degrees. As stated, the loop just formed is still retained on the billhook 66 with the severed tail ends still clamped between the jaws 75,78.

The subsequent strokes of the bale plunger 16 cause the wrapped bale 14 to move further rearwardly along the bale chamber 13 thereby also causing the loop to be pulled off the billhook 66 over the severed tail ends of the twine portions 20,43 and to tighten the loop around the tail ends. At this moment, the knot is actually completed. The tail ends of the twine portions 20,43 are finally also released under the increasing tensile load exerted thereon by the rearward movement of the bale in the bale chamber 13. Depending on the shape, dimensions and adjustments of the billhook 66, as is generally known in the art, the knot so formed will be an overhand knot or a bow knot.

During the second 60 degrees rotation of the twine holder shaft 64, the forward starwheel member 152 and the twine holder flanges 90 to 93 are rotated in unison therewith, so that, as this rotation is completed, the leg 153 of said starwheel member 152 assumes the position of the leg 153b and the pocket 158a with the secondary twine portion 43 received therein prior to the first 60 degrees cycle of the twine holder shaft 64, assumes the position of the pocket 158c as shown in FIG. 18. Thus the secondary twine portion 43 is trapped underneath the fifth twine guide 165 and is held thereby behind the face 156 of the starwheel member 152. This strand of twine becomes the primary twine portion 20 of the next bale to be formed and thus sufficient twine length is provided in the knotter for the following knot to be formed therein by looping said twine strand around the legs of said starwheel member 152.

As the needle 23 is further retracted, the pocket 158a in the starwheel member 152 and the groove 104 in the twine holder 63 are brought in position for receiving the primary twine portion 20 for the next bale. The twine portion looping back over the needle 23 then is placed in said pocket and in said groove and again the fourth and fifth guides 132,165 help in leading said twine portion to said pocket 158e, and the third guide 131 and the inclined surface 121 help in locating said twine portion in the twine gripping area 180 of the twine holder 63. As the needle 23 further retracts, said twine portion is equally placed against the first and second guides 110,112 from which it extends down into the bale case in front of the leading end 15 of a newly formed bale 14, and down through the eye of the needle 23 and then to the reel 22. This twine portion at this point in the cycle is firmly clamped in groove 102 between the flanges 90,93 of the twine holder 63 and the high pressure sections 126 of the twine fingers 116,117,118, so that, as already explained, said twine cannot slip through said components. As the new bale is being formed, said twine portion is caused to slide along the curved leading end 174 of the deflector member 170 in the bale chamber 13, whereby it will enter the elongate aperture and ultimately forcefully bear against the guide roller 61.

In typical prior art knotters a twine finger is required to place the twine in the correct position to engage the billhook and a stripping finger or the like is required to strip the loop of twine off the billhook jaws. With the present invention, however, the twine finger and twine stripper and drive means therefore are not necessary due to the particular arrangement of the twine holder relative to the billhook due to the provision of one or more stationary twine guides disposed in the vicinity of the path of the billhook and due to the fact that the billhook has a twine "assembling" and positioning cycle (more precisely the second half of the first billhook revolution) in addition to a knotting cycle. Furthermore, the normal movable knife blade for cutting the twine after a knot has been tied, has been replaced by a simple stationary knife with the relative movement required for the cutting operation being provided by the rotation of the twine holder. This further simplifies the structure.

Because of the small dimensions of the twine holder, because of the orientation of the twine holder shaft generally parallel to the path of the needle as it is moved in the vicinity of the knotter and because of the needle moving rather closely along the stationary twine guide positioned just forwardly of the path of the billhook, and also along the twine gripping area of the twine holder, the secondary twine portion is always correctly positioned relative to the path of said billhook so that the risk for the secondary twine portion escaping from the grasp of the billhook is completely eliminated irrespective whether or not the crop to be baled is tough or resilient and irrespective of the density at which the material is being baled. Thus the risks for misties are reduced accordingly.

Also, the very small dimensions of the twine holder (in comparison to existing twine holders) and the positioning of the twine holder shaft closely adjacent and parallel to the billhook shaft, have enabled to cause the billhook moving parallel to, and closely adjacent the lower and forward face of the twine holder in a manner so that the billhook path overlaps the major portion of said twine holder face. This again helps in the billhook positively grasping both twine portions held in the twine holder and thus in reducing the risks for misties.

Notwithstanding the fact that the twine holder is of an exceptionally small size, sufficient twine length is provided for the knot to be made in, without running any problems. This length is in part obtained by the fact that the primary twine portion extends from the twine holder in a direction away from the billhook to loop around a further member of the knotter at a distance from the billhook before it extends down to said billhook. Said further member conveniently is formed by a drive component of the twine holder. Sufficient twine length is further also in part obtained from the fact that, at the beginning of each knotting cycle, both twine portions extend from the twine holder around a stationary twine guide a distance from said twine holder and down to the bale chamber. As the billhook, during the first revolution, pushes both twine portions off the stationary guide, said twine portion extend directly down from the twine holder to the bale chamber so that additional twine length is thus obtained. Thus, the risks for pulling twine portions out of the twine holder before a knot is completed are avoided.

Also, notwithstanding the fact that the twine holder is exceptionally small in size, the twine portions are firmly held and prevented from slipping when this is so required on the one hand, and are allowed to gradually slip through the twine holder components at other points in the cycle. Also, because of its small dimensions, a reduced power is required to drive the twine holder.

The Geneva drive mechanism between the billhook shaft and the twine holder shaft is quite simple in design and enables the billhook to be driven continuously during each cycle while driving the twine holder at intervals. When not driven the twine holder is automatically latched in position so that any pull on the twine portions cannot disturb the timing of the twine holder. Furthermore, because of its intermittent drive, the twine holder is rotated during the knotting cycle only when it should assume another operating condition. Known twine holders are rotated gradually in timed relation with the billhook rotation during the entire cycle of the latter. As a result thereof, in changing from one operating condition to another, known twine holders are positioned during proportionally relatively long periods of time in intermediate positions. With a knotter according to the invention, the relative time lapse for pivoting the twine holder from one operating condition to another, during the knotting cycle, is rather reduced. This is advantageous for the good performance of the knotter.

From the foregoing it will be understood by those skilled in the art that a knotter according to the invention is of simple design, whereby it is simple to manufacture, assemble and adjust. The structure is very reliable and requires only a minimum of attention once it has left the factory. Field adjustments, if required at all, are readily accomplished and can be made by the average operator, whereby expensive harvesting delays are avoided. Variations in twine and the use of different types of twine only require minimum adjustments, if any at all. As a matter of fact, only the spring loading of the twine retainer fingers is made adjustable, as all other adjustment possibilities have been eliminated. The number of oscillating and complicated parts and of complicated drive means such as cams and cam followers, has been reduced to a minimum and most of the moving parts have rotational movement only. The remaining oscillatory components are small in size and have only small displacements. For this and other reasons, the inertia forces are less critical and hence the speed of operation of the knotter, and hence of the baler, can be increased substantially. Increased knotter speed does not adversely affect the quality of the knot tied.

Conventional knotters normally have a main drive arrangement for each knotter installed on the baler. As a baler usually employes two knotters, then two main drive means are required. However, two or more knotters according to the present invention can be driven by a simple, single main drive arrangement.

Due to the simple design and the reduced number of moving parts, it is possible significantly to reduce the number of greasing nipples per knotter. Conventional knotters normally have six or seven greasing nipples but a knotter according to the present invention only requires one greasing nipple for both the twine holder shaft and the billhook shaft.

Also due to the design of the knotter, the operation thereof will be effected to a lesser extent if at all, by the vibrations of the baler, the tension in the twine, the jarring of the baler as it moves through a field, variations in the crop condition such as tough or resilient crops causing the baler twine to jump about, moisture, dirt, crop debris and the like all subjecting the components to abrasion.

The angle of the billhook shaft relative to the bale chamber is advantageous for the reason that the billhook is positioned extremely close to the bale. Thus a shorter loop of twine around the bale and thus also a higher bale density is obtained in that the bale is bound tighter and does not expand to take up slack in the twine band. The chosen inclination of the billhook shaft, and also of the billhook, relative to the bale chamber is also advantageous in that the load on the twine as the knot is pulled off the billhook is reduced.

Finally, it will also be understood by those skilled in the art that the cost of a knotter according to the invention and the cost of field delays and servicing are reduced substantially in comparison with the costs of a conventional knotter.

It is anticipated that aspects of the present invention, other than those specifically defined in the appended claims, can be obtained from the foregoing description and the drawings.

Having thus described the invention, what is claimed is:

1. A knotter apparatus comprising:
 a twine holder operable to hold, during a knot tying operation, a primary and secondary portion of twine in which a knot is to be tied;
 a first shaft rotatably supported on a frame, said twine holder mounted on said first shaft;
 a plurality of spaced apart twine holder flanges mounted on said first shaft;
 a plurality of twine holder fingers pivotally supported by said frame and resiliently urged relative to said flanges;
 a second shaft rotatably supported on said frame;
 a billhook angularly mounted on said second shaft and operable to tie a knot in said primary and secondary twine portions;
 said first and second shafts extending substantially parallel to each other; and
 drive means connected for permitting the second shaft to intermittently drive the first shaft during knot tying operations.

2. A knotter according to claim 1 wherein the billhook comprises two jaws, one of which is movable relative to the other about a pivot disposed intermediate its ends, a heel portion formed integrally with the movable jaw and in use being cooperable with actuation means to effect opening of the jaws during part of the rotary movement of the billhook and resilient means operable to close the jaws during the remainder of the rotary movement of the billhook.

3. A knotter according to claim 1 wherein the billhook is rotatable through a first and a second cycle during a knot-tying operation, and operable during the first cycle to position the primary and secondary portions of twine in preparation for the knot-tying operation, and operable during the second cycle to tie the knot in the primary and secondary portions.

4. A knotter according to claim 3 wherein the first and second cycles each comprise a 360 degree movement of the billhook.

5. A knotter according to claim 3 wherein the twine holder is mounted for rotary movement and arranged to rotate through less than 360 degrees in timed sequence with the rotational movement of the billhook so as to move the primary and secondary twine portions relative to the twine retainer fingers, the arrangement being such that during the first cycle of the billhook the primary twine portion is held between the twine holder flanges and the second sections of the twine retainer fingers, and the primary and secondary twine portions are wedged between the twine holder flanges and the first portions of the twine retainer finger towards the end of the first billhook cycle, and such that, during the second cycle of the billhook, the primary and secondary twine portions are held between the twine holder flanges and the first sections of the twine retainer fingers and moved to the second section of the twine retainer fingers towards the end of the second billhook cycle.

6. A knotter according to claim 5 wherein the flanges are rotated over a first angular displacement at the end of the first billhook cycle and over a further angular displacement at the end of the second billhook cycle.

7. A knotter according to claim 6 wherein the flanges are angularly displaced during substantially the last quarter of the first and the second billhook cycles.

8. A knotter according to claim 7 wherein the flanges are rotated each time over substantially 60 degrees during their first and further angular displacements.

9. A knotter according to claim 1 wherein the billhook and twine holder flanges are rotatable in opposite directions.

10. A knotter according to claim 1 wherein during the rotational movement of the billhook, the twine holder flanges are rotated over 120 degrees.

11. A knotter according to claim 1 further also comprising a first stationary twine guide, extending in a transverse direction between the twine holder and the path of the billhook, and arranged for twine portions held in the twine holder to bear thereagainst and also arranged so that twine portions extending downwardly therefrom extend in the path of said billhook and are captured thereby upon rotation of the latter.

12. A knotter according to claim 1 further also comprising a second stationary twine guide extending in a transverse direction in the vicinity of the billhook and at a level so that during operation the billhook path extends between said second twine guide and the twine holder; the arrangement being such that twine portions held in the twine holder may bear against said second twine and extend in the path of said billhook.

13. A knotter according to claim 12 wherein the second stationary twine guide comprises a free end offset relative to the second shaft, but still at a location within the path thereof, when seen in the direction of the second shaft, the arrangement being such that, in operation, the billhook shifts, twine portions held in the twine holder and bearing against the second twine guide, transversely away from the second shaft and over said free end in a manner to position said twine portions together and relative to the billhook in preparation for the knot to be tied therein.

14. A knotter according to claim 13 wherein at its free end, the second twine guide is bent in the direction of the billhook when the latter is in a rest position.

15. A knotter according to claim 1 wherein the drive means comprises an eccentric driver cam on the second shaft and a starwheel shaped driven member on the first shaft engageable at intervals by the driver cam.

16. A knotter according to claim 15 wherein the starwheel shaped driven member comprises six legs equispaced around the periphery thereof.

17. A knotter according to claim 16 further also comprising locking means operable to firmly lock the first shaft in position except when driven by the driver cam.

18. A knotter according to claim 17 wherein the locking means comprise a generally cylindrical body secured on the second shaft and having a cut-away section at a predetermined part of its periphery defining a release surface and a starwheel type locking member secured on the first shaft and having a plurality of concaved sides engageable with the cylindrical body, the arrangement being such that, when any of said concaved sides of the starwheel type locking member engages the cylindrical body, the first shaft is locked in position, and, when the release surface faces the starwheel type locking member, the first is unlocked.

19. A knotter according to claim 18 wherein the starwheel type locking member comprises six concaved sides equispaced around the periphery thereof.

20. A knotter according to claim 19 wherein the release surface, when seen in the direction of rotation of the second shaft, generally leads the driver cam.

21. A knotter according to claim 1 wherein the drive means are in the form of a Geneva drive mechanism.

22. A knotter according to claim 1 wherein the twine holder is arranged for the primary portion of twine to extend from one groove in the twine holder flanges to an adjacent groove therein during part of the knot-tying operation, and further comprising looper means at a distance from the twine holder flanges and rotatable in unison therewith, the looper means being operable to form a loop in the primary portion of twine between the free end thereof held in said first twine holder groove and the point at which the primary twine portion is held in the adjacent twine holder groove, so as to provide a sufficient length of primary twine portion for the knot-tying operation.

23. A knotter according to claim 22 wherein the looper means are provided at the side of the twine holder facing away from the billhook.

24. A knotter according to claim 23 wherein the looper means are of the starwheel type comprising at least as many legs as there are grooves in the twine holder flanges.

25. A knotter according to claim 24 wherein adjacent legs of the starwheel type looper means form twine receiving pockets therebetween which are generally aligned with the grooves in the twine holder flanges.

26. A knotter according to claim 25 further also comprising a stationary twine guide positioned relative to one of the pockets in the looper means when the twine holder is in a rest position in a manner to direct a twine portion towards said pocket as it is being placed in the twine holder.

27. A knotter according to claim 26 also comprising a further stationary twine guide cooperable with the legs of the looper means for trapping twine therebehind after placement in one of said pockets and after subsequent rotation of the twine holder and looper means.

28. A knotter according to claim 27 wherein the further stationary twine guide is provided at the side of the looper means facing away from the twine holder and extends generally parallel to the rotary axis of the twine holder and the looper means.

29. A knotter according to claim 28 wherein the looper means comprise twice as many legs as there are twine holder grooves, pairs of adjacent legs cooperating to form the loop in the primary portion of twine.

30. A knotter according to claim 29 wherein the looper means are formed by the starwheel shaped driven member on the first shaft.

31. A knotter mechanism comprising a twine holder including a plurality of coaxial, spaced apart, rotatable twine holder flanges, each having a plurality of notches formed at its outer periphery and twine fingers disposed one between each pair of adjacent twine holder flanges and operable to grip twine portions in conjunction with the twine flanges, looper means at a distance from the twine holder flanges and rotatable in unison therewith; a twine dispensing mechanism including a twine carrying needle movable back and forth in the vicinity of the twine holder, and means for driving the needle, the twine holder flanges and the looper means in timed relation in a manner so that, as the needle is extended in the vicinity of the twine holder, a twine portion is first placed in a first set of corresponding notches, subsequently looped around the looper means as the twine holder flanges and looper means are rotated, and finally placed in an adjacent set of corresponding notches as the needle is retracted and the twine holder flanges and looper means are further rotated.

32. A knotter according to claim 31 further also comprising a rotary billhook rotatable about an axis to which it is inclined and operable to tie a knot in the twine portions held in the twine holder.

33. A knotter comprising a twine holder operable to hold, during a knot-tying operation, a primary portion and a secondary portion of twine in which a knot is to be tied, a stationary twine guide at a distance from the twine holder, a twine dispensing mechanism including a twine carrying needle movable back and fourth in the vicinity of the twine holder and the stationary twine guide and operable to place the primary and secondary portions of twine against said twine guide and in the twine holder, the twine holder in turn being operable to grip and hold the twine portions placed therein; and a rotatable billhook rotatable through a first and a second cycle during the knot-tying operation in a plane extending between the twine guide and the twineholder, the path of the billhook intersecting the twine portions projecting from the twine holder across the twine guide, and the billhook being operable during its first cycle to push the twine portions, laid across the twine guide, off said twine guide for repositioning them in preparation for the knot to be tied therein and operable during the second cycle to tie the knot in the primary and secondary portions of twine.

34. A knotter according to claim 33 wherein the twine holder comprises a plurality of coaxial, spaced apart rotary twine holder flanges each having a plurality of notches formed in its outer periphery and twine fingers disposed one between each pair of adjacent twine holder flanges and operable to grip the primary and secondary twine portions in conjunction with the twine holder flanges; and wherein the stationary twine guide and the path of the billhook extend substantially parallel to the twine holder flanges.

35. A knotter according to claim 34 wherein the path of the billhook substantially overlaps the twine holder flanges, when seen in the direction of the rotary axis of the twine holder.

36. A knotter according to claim 35 wherein the twine holder flanges and the billhook are rotatable in planes inclined at an angle in the range of 50 to 60 degrees relative to the horizontal.

37. A knotter according to claim 33 wherein the first and second cycles of the billhook each comprise a 360 degree cycle.

38. A knotter according to claim 33 wherein the billhook and the twine holder flanges are rotatable in opposite directions.

39. A knotter according to claim 33 wherein the twine guide is disposed at the side of the billhook rotary axis opposite to the billhook when the latter is in the rest position.

40. A knotter according to claim 33 wherein the twine guide has a free end offset relative to the billhook rotary axis, but still at a location within the path of the billhook, when seen in the direction of the billhook rotary axis, the arrangement being such that, during the first cycle of the billhook, the latter shifts the twine portions, held in the twine holder and bearing against the twine guide transversely away from the billhook rotary axis and over the free end, in a manner to reposition said twine portions together and relative to the billhook for the billhook to capture said twine portions and to tie a knot therein during its second cycle.

41. A knotter according to claim 40 wherein at its free end, the twine guide is bent in the direction of the billhook when the latter is in the rest position.

42. A knotter according to claim 41 also comprising a further stationary twine guide extending in a transverse direction between the twine holder flanges and the path of the billhook and arranged for, at least when the billhook has shifted the twine portions off said first twine guide during its first cycle, said twine portions to bear thereagainst and to extend therefrom in the path of the billhook during the second billhook cycle, thus permitting the billhook to capture said twine portions and to tie the knot therein during said second cycle.

* * * * *